(12) United States Patent
Kanetake et al.

(10) Patent No.: US 9,569,674 B2
(45) Date of Patent: Feb. 14, 2017

(54) MOVEMENT AMOUNT ESTIMATION DEVICE, MOVEMENT AMOUNT ESTIMATION METHOD, AND COMPUTER-READABLE RECORDING MEDIUM STORING MOVEMENT AMOUNT ESTIMATION PROGRAM

(71) Applicant: FUJITSU LIMITED, Kawasaki-shi, Kanagawa (JP)

(72) Inventors: Jun Kanetake, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/658,507

(22) Filed: Mar. 16, 2015

(65) Prior Publication Data
US 2015/0286879 A1 Oct. 8, 2015

(30) Foreign Application Priority Data
Apr. 4, 2014 (JP) .................................. 2014-078212

(51) Int. Cl.
*G06K 9/00* (2006.01)
*G06T 7/00* (2006.01)
*G06T 7/20* (2006.01)

(52) U.S. Cl.
CPC ......... *G06K 9/00798* (2013.01); *G06T 7/0083* (2013.01); *G06T 7/0085* (2013.01);
(Continued)

(58) Field of Classification Search
None
See application file for complete search history.

(56) References Cited

U.S. PATENT DOCUMENTS

| | | | | |
|---|---|---|---|---|
| 5,495,536 A | * | 2/1996 | Osbourn ................ | G06K 9/346 382/174 |
| 5,592,567 A | * | 1/1997 | Kilger ................ | G06K 9/00785 382/199 |
| 6,445,809 B1 | | 9/2002 | Sasaki et al. | |
| 2008/0109118 A1 | * | 5/2008 | Schwartz ............. | G06K 9/4609 701/1 |
| 2009/0010482 A1 | * | 1/2009 | Nishida .............. | G06K 9/00798 382/100 |
| 2009/0268027 A1 | * | 10/2009 | Yang ........................ | B60R 1/00 348/148 |
| 2012/0008019 A1 | * | 1/2012 | Zhang ................ | G06K 9/00791 348/251 |
| 2012/0008020 A1 | * | 1/2012 | Zhang ................ | G06K 9/00791 348/251 |
| 2012/0008021 A1 | * | 1/2012 | Zhang ................ | G06K 9/00791 348/251 |
| 2013/0121592 A1 | * | 5/2013 | Fujiki .................. | G01B 11/002 382/195 |
| 2015/0195496 A1 | * | 7/2015 | Hayakawa ................ | B60R 1/00 348/118 |
| 2015/0199579 A1 | * | 7/2015 | Stainvas Olshansky ........... | G06K 9/4642 382/104 |
| 2015/0227800 A1 | * | 8/2015 | Takemae ............... | G06T 7/0081 382/104 |

(Continued)

FOREIGN PATENT DOCUMENTS

| | | | |
|---|---|---|---|
| CN | 102881161 | * | 1/2013 |
| EP | 1 918 853 A2 | | 5/2008 |

(Continued)

OTHER PUBLICATIONS

Tsugawa "Vision-Based Vehicles in Japan: Machine Vision Systems and Driving Control Systems," 1994 IEEE.*
(Continued)

*Primary Examiner* — Amir Alavi
(74) *Attorney, Agent, or Firm* — Staas & Halsey LLP

(57) ABSTRACT

A movement-amount-estimation device includes an edge-removal unit to generate a first edge-removed image by removing from a first edge-image a first-removal-target edge by on a change in brightness indicated by edge intensity in a direction from an inner side to an outer side of a mobile body, the first edge-image being generated from a first image taken by an imaging device mounted on the mobile body, and to generate a second-edge-removed image by removing from a second edge-image a second-removal-target edge by the change in brightness indicated by the edge intensity in the direction from the inner side to the outer side, the second edge-image being generated from a second image taken at a different clock time than the first image; and an output unit configured to output a movement amount of the mobile body that is estimated based on the first edge-removed image and the second edge-removed image.

15 Claims, 24 Drawing Sheets

(52) U.S. Cl.
CPC .......... *G06T 7/2033* (2013.01); *G06T 7/2073* (2013.01); *G06T 2207/10016* (2013.01); *G06T 2207/30256* (2013.01)

(56) References Cited

U.S. PATENT DOCUMENTS

| | | | | |
|---|---|---|---|---|
| 2015/0317526 | A1* | 11/2015 | Muramatsu | G06K 9/00812 348/148 |
| 2015/0371096 | A1* | 12/2015 | Stein | G06K 9/00805 382/103 |

FOREIGN PATENT DOCUMENTS

| | | |
|---|---|---|
| JP | 9-72716 | 3/1997 |
| JP | 2003-337999 | 11/2003 |
| JP | 2004-338637 | 12/2004 |
| JP | 2009-265783 | 11/2009 |
| JP | 2010-15367 | 1/2010 |
| WO | 2014/017625 A1 | 1/2014 |

OTHER PUBLICATIONS

Extended European Search Report issued Sep. 21, 2015 in corresponding European Patent Application No. 15158391.1.

Jin-Wook Lee et al., "Effective lane detection and tracking method using statistical modeling of color and lane-edge orientation", 2009 Fourth International Conference on Computer Sciences and Convergence Information Technology, Nov. 24, 2009 IEEE, XP031593655, pp. 1586-1591.

Kiang Ruyi et al., "Lane detection and tracking using a new lane model and distance transform", Machine Vision and Applications, Springer-Verlag 2011, Jan. 19, 2011, XP019916774, pp. 721-737.

"Development of a Monocular Ranging and Verification System Using an Onboard Camera", SEI Technical Review, Issue No. 169, pp. 82-87, Jul. 2006.

"Development of 3D Scene Analysis System Using In-Vehicle Camera", SEI Technical Review, Issue No. 63, pp. 40 to 46, Dec. 2006.

* cited by examiner

MOVEMENT AMOUNT ESTIMATION DEVICE, MOVEMENT AMOUNT ESTIMATION METHOD, AND COMPUTER-READABLE RECORDING MEDIUM STORING MOVEMENT AMOUNT ESTIMATION PROGRAM

CROSS-REFERENCE TO RELATED APPLICATION

This application is based upon and claims the benefit of priority of the prior Japanese Patent Application No. 2014-078212, filed on Apr. 4, 2014, the entire contents of which are incorporated herein by reference.

FIELD

The embodiments discussed herein are related to a movement amount estimation device, a movement amount estimation method, and a computer-readable recording medium storing movement amount estimation program.

BACKGROUND

There has been known a technology for mounting a camera configured to image the outside on a mobile body such as a vehicle, taking a picture of the surroundings including a road surface, and estimating a movement amount of the mobile body from a movement amount of a pattern on the road surface in the images taken at two different clock times (see, "Development of a Monocular Ranging and Verification System Using an Onboard Camera", *SEI Technical Review*, Issue No. 169, pp. 82 to 87, July 2006, for example). In such a technology, a movement amount may not be estimated with high accuracy due to an influence such as a shade of the own vehicle, for example, when a lane boundary position or a solid object is detected from the images taken, and the like. Thus, there has also been known a technology for improving detection accuracy of a lane boundary position or a solid object (see, Japanese Laid-open Patent Publication Nos. 2003-337999, 2009-265783, 2010-15367, 2004-338637, and 09-72716, for example).

SUMMARY

According to an aspect of the invention, a movement amount estimation device includes an edge removal unit configured to generate a first edge-removed image by removing a first removal target edge based on a change in brightness indicated by edge intensity in a direction from an inner side to an outer side of a mobile body from a first edge image, the first edge image being generated from a first image taken by an imaging device mounted on the mobile body, and to generate a second edge-removed image by removing a second removal target edge based on the change in brightness indicated by the edge intensity in the direction from the inner side to the outer side of the mobile body from a second edge image, the second edge image being generated from a second image taken at a different clock time than the first image; and an output unit configured to output a movement amount of the mobile body that is estimated based on the first edge-removed image and the second edge-removed image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, in the related art, for images at two clock times which are used to estimate a movement amount, images taken in a short period of time which seem to include a common road surface pattern are used. Thus, in the images at the two clock times, a shade of an own vehicle is often fixed relative to a position of the own vehicle. Accordingly, a matching degree of shades is high in the images at two time clocks which include the shade of the own vehicle. When a movement amount is estimated through matching of images, the movement amount may be estimated as zero although a vehicle has actually moved. In addition, a road surface pattern and the like may not be detected with high accuracy due to the shade of the own vehicle. As such, in images used to estimate a movement amount, influence of a shade of an own vehicle is complicated, and in some cases, it is difficult to remove the influence with the conventional technologies as described above.

Accordingly, it is desired to make it possible to estimate a movement amount of a mobile body with high accuracy even when a shade of the mobile body is present in an image.

First Embodiment

Figure 1:
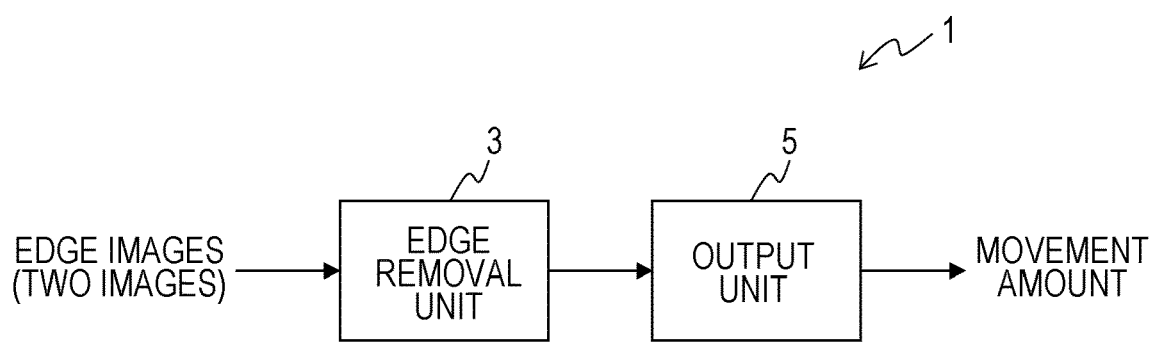
FIG. 1 is a block diagram illustrating one example of a functional configuration of a movement amount estimation device according to a first embodiment.

A movement amount estimation device 1 according to a first embodiment is described hereinafter with reference to the drawings. FIG. 1 is a block diagram illustrating one example of a functional configuration of the movement amount estimation device 1 according to the first embodiment. The movement amount estimation device 1 is a device configured to receive two edge images generated based on images which include a mobile body and are acquired at two different clock times, and to output a movement amount of the mobile body.

As illustrated in FIG. 1, the movement amount estimation device 1 includes an edge removal unit 3 and an output unit 5. The edge removal unit 3 is configured to generate an edge-removed image by removing removal target edges, based on a change in brightness indicated by edge intensity in a direction from the inner side to the outer side of a mobile object, in an edge image generated from an image taken by an imaging unit mounted on the mobile body. Here, the edge image is an image which is represented by a characteristic amount calculated based on a pixel value in the image taken by the imaging unit. The edge image is generated by performing differential processing on the image, for example. The characteristic amount calculated by the differential processing is the edge intensity, for example.

The output unit outputs an estimated movement amount that is estimated based on a first edge-removed image and a second edge-removed image. The first edge-removed image is an image that is generated from a first image taken by the imaging unit mounted on the mobile body, and from which the removal target edges are removed by the edge removal unit 3 based on the change in brightness viewed in the direction from the inner side to the outer side of the mobile body. The second edge-removed image is generated from a second edge image that is generated from a second image taken at a different clock time from the first image. More specifically, the second edge-removed image is an image from which second removal target edges are removed by the edge removal unit 3, based on the change in brightness in the direction from the inner side to the outer side of the mobile body, in the second edge image. A direction of brightness change, which is indicated by the edge intensity on an edge image, from the side close to the center of a mobile body to the side far from the center of the mobile body, is hereinafter referred to as a brightness change direction. In addition, the direction from the inner side (side close to the center of the mobile body) to the outer side (side far from the center of the mobile body) of the mobile body is referred to as a radial direction.

Figure 2:
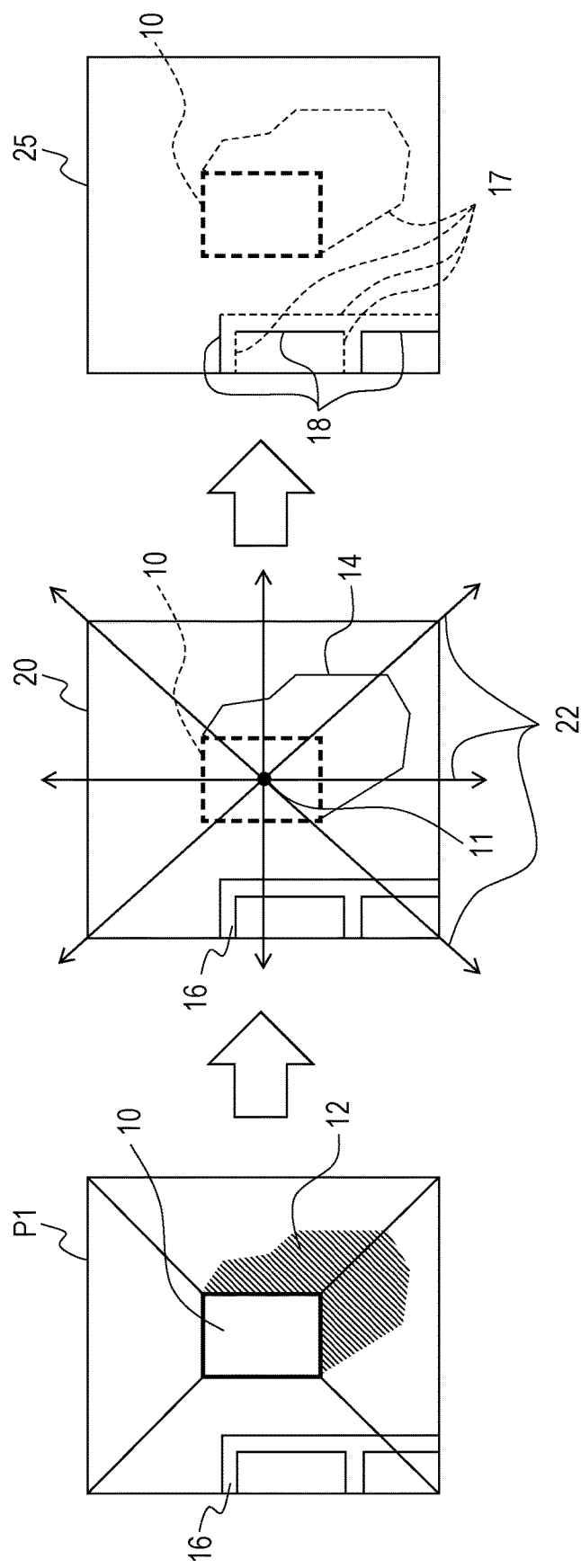
FIG. 2 is a view illustrating one example of processing by an edge removal unit of the movement amount estimation device according to the first embodiment.

FIG. 2 is a view illustrating one example of processing by the edge removal unit 3 of the movement amount estimation device 1 according to the first embodiment. Hereinafter, image of a mobile body or the like in an image is referred as to a mobile body on an image or included in an image as appropriate.

As illustrated in FIG. 2, a first image P1 is a road surface projection image including a mobile body 10. The first image P1 is a road surface projection image including the mobile body 10. The first image P1 may also be generated based on images captured by a plurality of cameras provided on the mobile body 10. A white line 16 is imaged in the first image P1. A self-shade 12 of the mobile body 10 is also imaged. A self-shade is a shade of a mobile body made by illuminating light or sunlight.

An edge image 20 is an image generated by applying differential processing with a Sobel filter, for example, on the first image P1. The edge image 20 includes edges 14 which include a plurality of edges by the self-shade 12. In the following, when a line segment is referred to as an edge as in the edges 14, the edge shall generically mean a plurality of edges in the vicinity of that line segment.

A radial direction 22 illustrates an example of a direction from the center of the mobile body 10 to the outer side of the mobile body 10. The edge removal unit 3 removes removal target edges judged to be removed based on the bright change direction of the radial direction 22 from the center of the mobile body 10 to the outer side. The removal target edges may be edges on which the brightness change direction of the radial direction is a direction from darkness to brightness. The brightness change direction may also be judged based on a degree of edge intensities of the edges in the edge image 20, for example, in two directions which are orthogonal to each other.

An edge-removed image 25 represents an example of an image in which the removal target edges are removed by the edge removal unit 3. The edge-removed image 25 is an example in which edges whose brightness change direction in the radial direction 22 indicates a direction from darkness to brightness (hereinafter referred to as a darkness-brightness direction) are removed. In the edge-removed image 25, removal target edges 17 are removed. On the one hand, some edges 18 of the white line 16 remain. The edges 14 of the self-shade 12 in the edge image 20 indicate the darkness-brightness direction which shifts from a dark area to a bright area because the edges 14 shift from the self-shade to the road surface when viewed in the radial direction 22. Thus, the edges 14 are the removal target edges. Therefore, in the edge-removed image 25, while the edges 14 by the self-shade 12 are removed, at least a part of the edges of the white line 16 is not removed. Accordingly, a movement amount may be estimated by using edge-removed images generated based on images which are taken at two different clock times and include a mobile body.

As described above, with the movement amount estimation device 1 according to the first embodiment, a self-shade may be removed in an edge image by removing removal target edges based on the brightness change direction viewed from the center of the mobile body 10 to the radial direction. In addition, in the edge-removed image 25, like the edges 18, at least a part of the edge associated with the white line 16 that is desirable when a movement amount is estimated is not removed.

As described above, with the movement amount estimation device 1 according to the first embodiment, a movement amount may be estimated by performing image matching of two edge-removed images which are each generated based on images taken at two different clock times. In this manner, a self-shade of a mobile body is removed in an edge-removed image. Thus, even when a self-shade by illuminating light is imaged in taken images, a movement amount may be estimated with high accuracy and without being adversely affected by the self-shade. More specifically, when a movement amount is estimated, any effect of a self-shade is removed while at least a part of edges associated with a white line on a road surface remains.

In the movement amount estimation device 1, as a self-shade property is used a property that a brightness-darkness pattern of an edge at a border between a self-shade and a road surface is in a direction from darkness to brightness in a road surface projection image when viewed from a neighborhood of the center of the mobile body to the radial direction. Since an edge whose brightness change direction is darkness to brightness is extracted in this manner, and no time-series data is used when a self-shade is removed, the self-shade may be removed from a road surface projection image at one clock time, irrespective of a change in shade positions. As the self-shade property, the self-shade scarcely changes in a shape/position in a short period of time. However, by removing a self-shade from an image, when a movement amount is estimated through image matching, a cause of error that a movement amount is judged as zero although a mobile body moves may be removed because of a high matching degree using the self-shade.

On the one hand, when a self-shade is removed by utilizing the property that a self-shade makes little movement even when a mobile body moves and removing a motionless part from an image, a part of a road surface pattern which is parallel to a traveling direction may be misidentified as a self-shade. However, the movement amount estimation device 1 according to the first embodiment may avoid excessive removal of characteristics of the road surface pattern attributable to misidentification of some of the road surface pattern as a self-shade.

Second Embodiment

A movement amount estimation device 50 according to a second embodiment is described hereinafter. Same signs are assigned to a configuration and operation similar to the movement amount estimation device 1 according to the first embodiment and an overlapping description is omitted.

Figure 3:
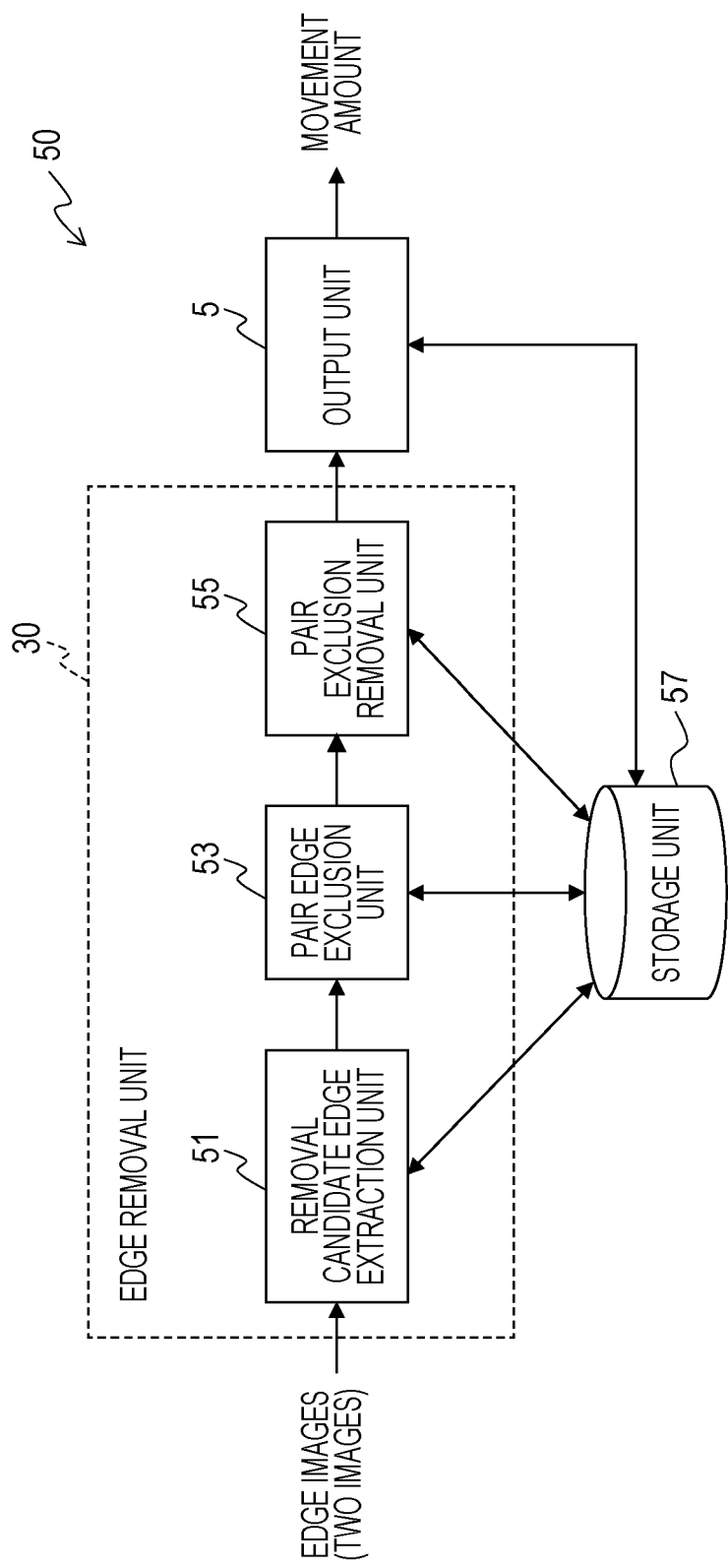
FIG. 3 is a block diagram illustrating one example of a functional configuration of a movement amount estimation device according to a second embodiment.

FIG. 3 is a block diagram illustrating one example of a functional configuration of the movement amount estimation device 50 according to the second embodiment. The movement amount estimation device 50 according to the second embodiment includes an edge removal unit 30 in place of the edge removal unit 3 of the movement amount estimation device 1. In addition, similar to the movement amount estimation device 1, the movement amount estimation device 50 includes an output unit 5. The edge removal unit 30 further includes a removal candidate edge extraction unit 51, a pair-edge exclusion unit 53, a pair exclusion removal unit 55, and a storage unit 57.

The removal candidate edge extraction unit 51 is configured to extract removal target edges in an edge image based on the brightness change direction viewed in the radial direction. For example, in the edge image, the removal candidate edge extraction unit 51 extracts as a removal candidate edge an edge whose brightness change direction viewed in the radial direction is in the direction of darkness to brightness. The removal candidate edge is a candidate edge for a removal target edge which is actually a target of removal at the stage in which the removal candidate edge is extracted.

The pair-edge exclusion unit 53 is configured to exclude a pair-edge from edges that are judged as a removal candidate edge by the removal candidate edge extraction unit 51. The pair-edge is a removal candidate edge extracted in an edge image, and refer to edge that have an edge judged to mutually offset a change in brightness when paired with another edge. Mutually offsetting a change in brightness refers to, for example, a state in which an edge, such as the removal candidate edge, in the darkness-brightness direction and an edge in the brightness-darkness direction each of which have an almost same amount of change in brightness are present in a predetermined area. For example, the pair-edge is judged as, for example, a removal candidate edge which is associated with an edge in the neighborhood of the removal candidate edge, where the brightness change direction of the edge viewed from the center of a mobile body to the radial direction is a direction from brightness to darkness (hereinafter referred to as a brightness-darkness direction) and an amount of change in brightness of the edge is almost same to that of the removal candidate edge.

In processing of the pair-edge exclusion unit 53, it is intended not to remove an edge associated with a white line drawn on a road surface when an edge associated with a self-shade is removed from an edge image, by excluding the pair-edge from removal candidate edges. Namely, a characteristic is considered that white lines on a road surface are often drawn at certain width and the brightness change direction is present as a pair of the darkness-brightness direction and the brightness-darkness direction. Whether or not an edge is a pair-edge is judged based on the edge intensity of an edge included in a predetermined area including a removal target edge, and a corresponding brightness change direction, for example. Details of a method for judging whether or not edges are pair-edges are described below.

The pair exclusion removal unit 55 is configured to remove from an edge image removal target edges in which a pair-edge is removed from removal candidate edges by the pair-edge exclusion unit 53. With this, a pair-exclusion-edge-removed image from which an edge associated with a self-shade is removed may be obtained. Then, since pair-edge associated with a white line is not a target of removal, removal of the pair-edge from the pair-exclusion-edge-removed image is avoided.

The output unit 5 outputs a movement amount which is estimated based on two pair-exclusion-edge-removed images that are based on images taken at different clock times. The storage unit 57 is a storage device which stores, for example, a taken image, or an edge image of the taken image, and an edge list 190 to be described below.

Figure 4:
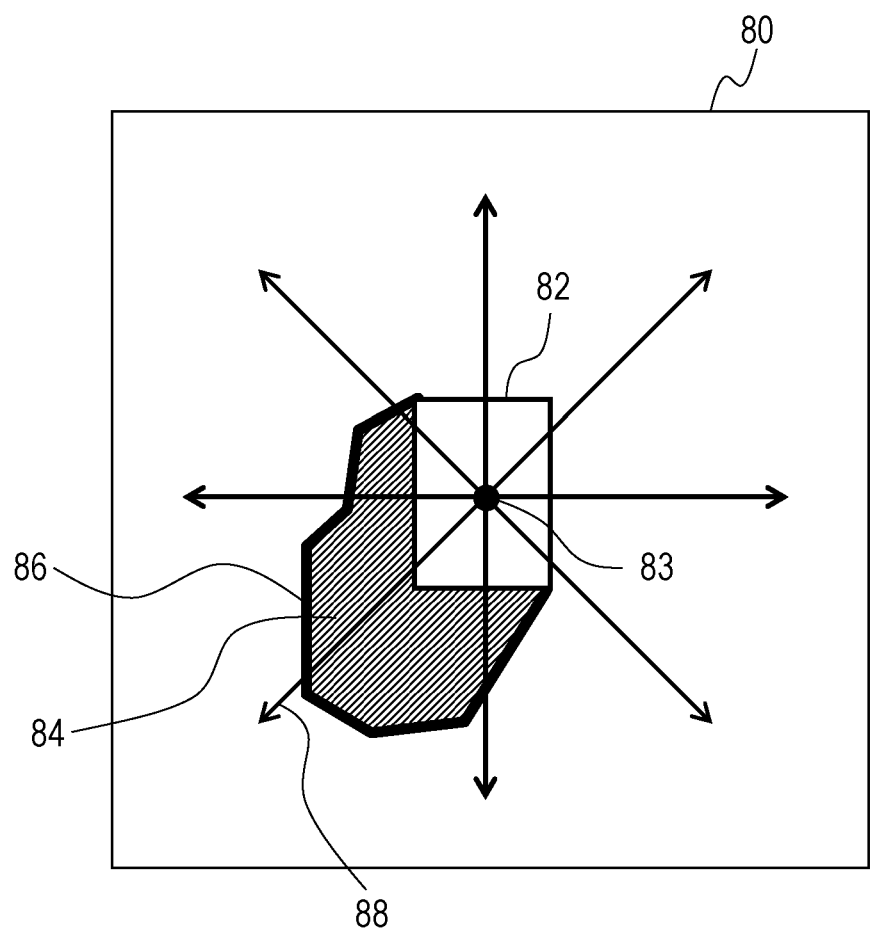
FIG. 4 is a view illustrating one example of a road surface projection image according to the second embodiment.

FIG. 4 is a view illustrating a road surface projection image 80 according to the second embodiment. Darkness-brightness direction edges 86 are depicted in the road surface projection image 80. A mobile body 82 and a self-shade 84 are also included in the road surface projection image 80. The darkness-brightness direction edges 86 represent a plurality of edges associated with a self-shade 84 and is generated by performing, for example, differentiation processing on a road surface projection image including the mobile body 82. A center 83 represents the center of the mobile body 82, for example. A radial direction 88 is a direction from the center 83 to the outer side of the road surface projection image 80. Viewed in the radial direction 88, the darkness-brightness direction edges 86 are edges whose brightness changes in a direction from darkness to brightness. Note that details of an example of judgment on the brightness change direction are described below.

Figure 5:
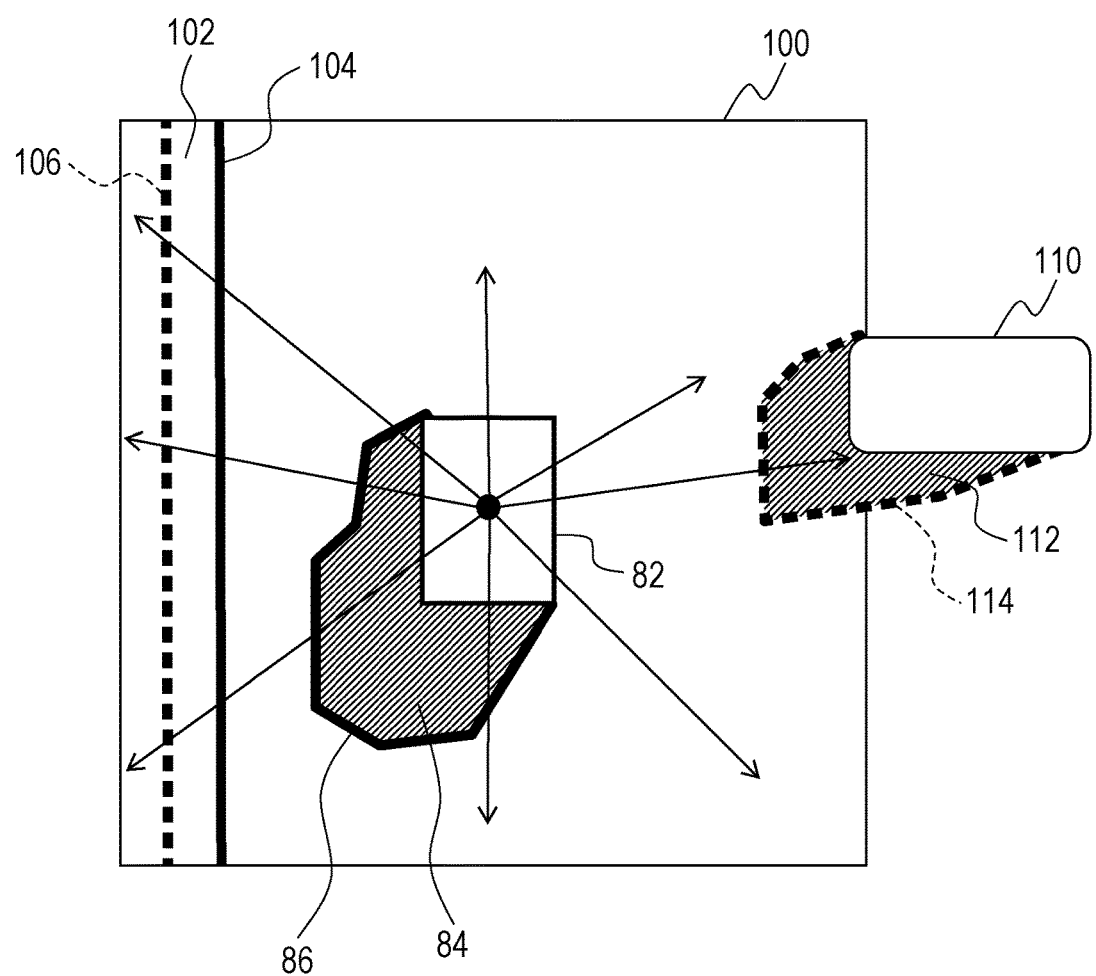
FIG. 5 is a view illustrating another example of the road surface projection image according to the second embodiment.

FIG. 5 is a view illustrating a road surface projection image 100 according to the second embodiment. The road surface projection image 100 includes a white line 102 and another vehicle 110, in addition to the mobile body 82. A darkness-brightness direction edge 104 and a brightness-darkness direction edge 106 are edges associated with the white line 102. The other vehicle 110 has a shade 112. A brightness-darkness direction edge 114 is an edge associated with the shade 112. As just described, in the shade 112 of the other vehicle 110, since the associated edge is the brightness-darkness direction edge 114, the shade 112 of the other vehicle 110 is not removed even when the darkness-brightness direction edge viewed in the radial direction 88 is removed. For the white line 102, it is illustrated that the darkness-brightness direction edge 104 and the brightness-darkness direction edge 106 are a pair in a range including the white line 102. Thus, in the pair-exclusion-edge-removed image, the white line 102 remains by causing the pair exclusion removal unit 55 to exclude the pair-edges from the removal candidate edges.

Figure 6:
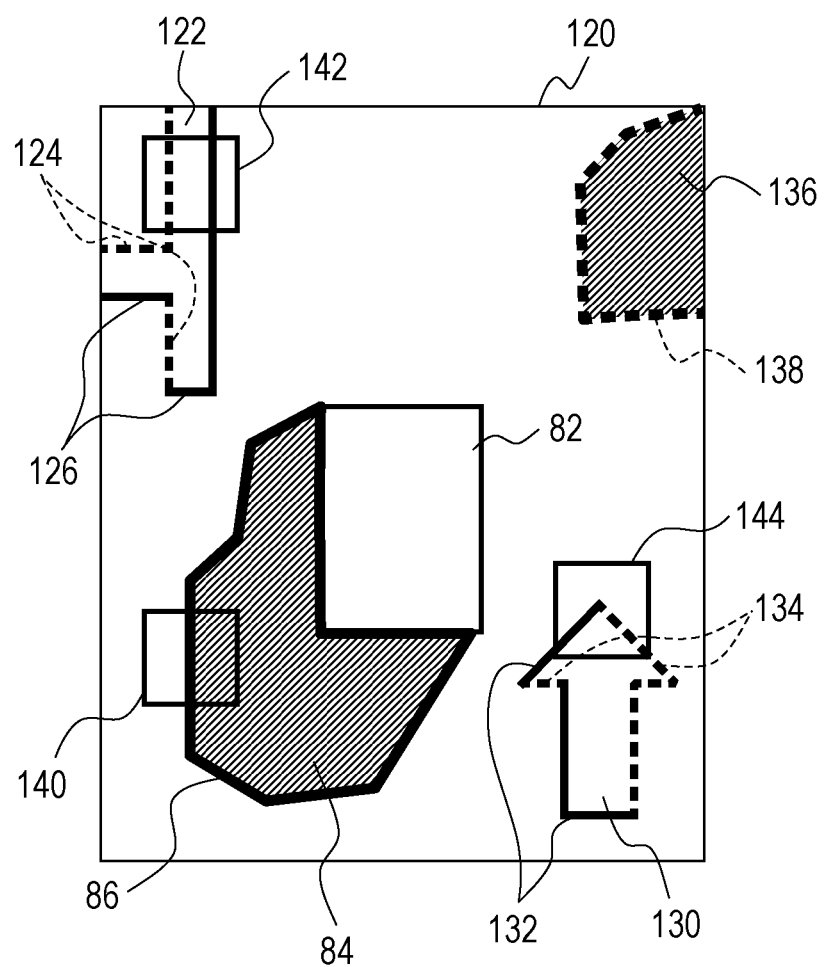
FIG. 6 is a view illustrating one example of a pair-edge exclusion method in the road surface projection image according to the second embodiment.

FIG. 6 is a view illustrating one example of a pair-edge exclusion method in a road surface projection image 120 according to the second embodiment. The road surface projection image 120 includes a white line 122, a white line 130, and another shade 136, in addition to the mobile body 82. A darkness-brightness direction edge 124 and a brightness-darkness direction edge 126 are edges associated with the white line 122. A darkness-brightness direction edge 132 and a brightness-darkness direction edge 134 are edges associated with the white line 130. A brightness-darkness direction edge 138 is an edge associated with the other shade 136.

Predetermined areas 140, 142, 144 are depicted in the road surface projection image 120. In this example, the predetermined areas 140, 142, 144 are rectangular areas having sides parallel to the vertical direction of the road surface projection image 120 and sides parallel to the horizontal direction. The predetermined area 140 is associated with one of the darkness-brightness direction edges 86 of the self-shade 84 of the mobile body 82, and set to include the edge. The edge is referred to as a set edge of the predetermined area 140. The predetermined area 140 is illustrated as an example of a predetermined area whose set edge is not a pair-edge associated with the white line. More specifically, in the predetermined area 140, it is judged that the set edge is not associated with an edge to be a pair-edge which is offset by the set edge in the predetermined area 140.

The predetermined area 142 is an example of an area including the darkness-brightness direction edges 124 and the brightness-darkness direction edges 126. The predetermined area 142 is set in association with a set edge of the darkness-brightness direction edges 124. In the predetermined area 142, when it is judged that the set edge of the darkness-brightness direction edges 124 and any edge in the predetermined area 142 are mutually offset, it is judged that the set edge associated with the predetermined area 142 is judged as a pair-edge.

Also in the predetermined area 144, when it is also judged that a set edge of the darkness-brightness direction edges 132 is paired with any edge in the predetermined area 144, the set edge of the predetermined area 144 is judged as a pair-edge. As described above, a predetermined area is set for each of extracted removal target edges, and it is judged in each of the predetermined areas whether or not a set edge is a pair-edge. Details of a method for judging a pair-edge are described below.

Figure 7:
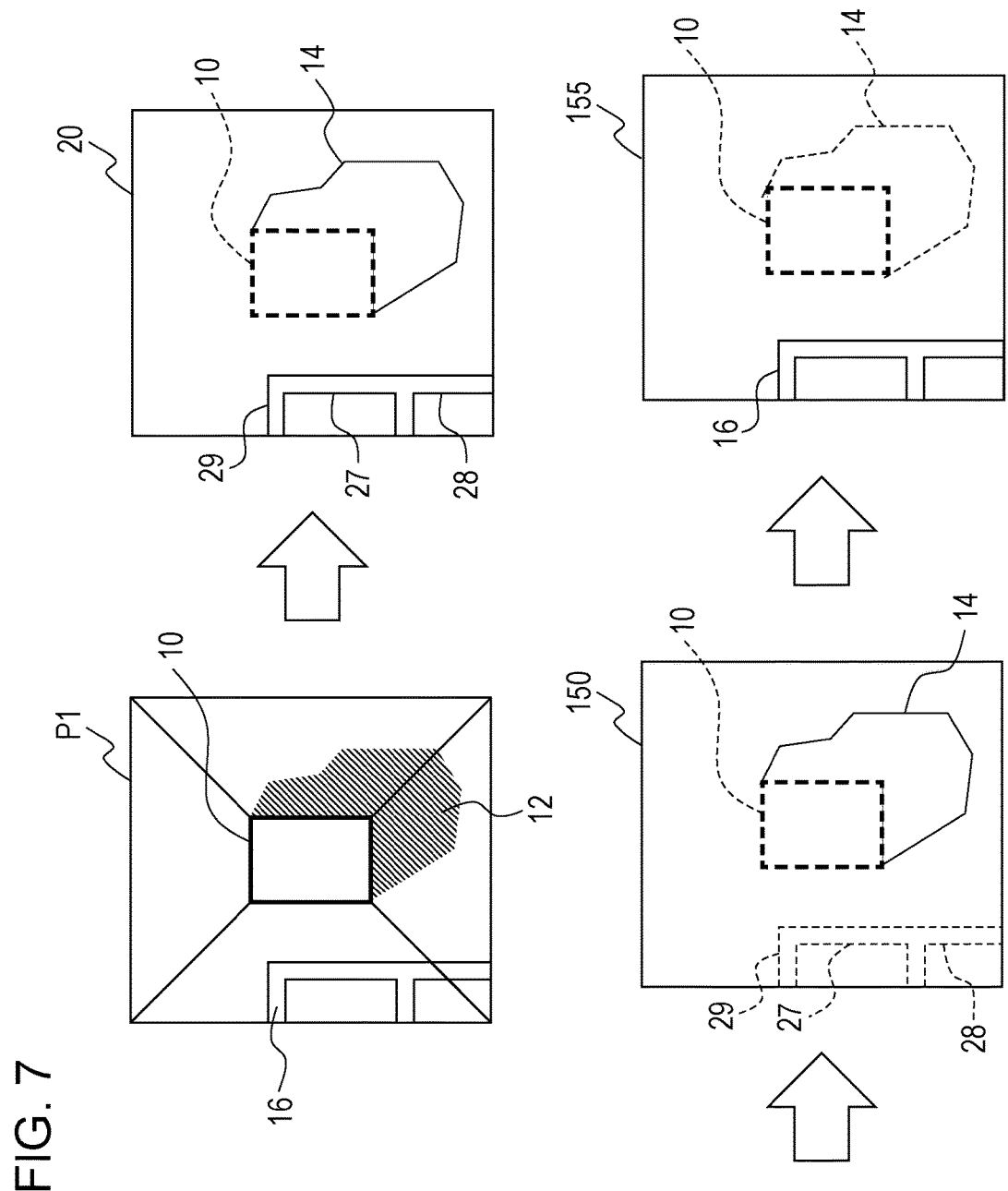
FIG. 7 is a view illustrating one example of a self-shade removal process according to the second embodiment.

FIG. 7 is a view illustrating one example of a self-shade removal process according to the second embodiment. As illustrated in FIG. 7, for example, a mobile body 10, a self-shade 12, and a white line 16 on a road surface are included in a first image P1. An edge image 20 is generated by performing differential processing on the first image P1. Edge 14 and edges 27 to 29 are included in the edge image 20. The edge 14 corresponds to a border from the self-shade 12 to the road surface. The edges 27 to 29 correspond to the borders between the white line 16 and the road surface.

Using the edge image 20, there are extracted removal candidate edges in the darkness-brightness direction viewed in the radial direction from the center of the mobile body 10 to the outer side. A pair-edge associated with an edge of the brightness-darkness direction is excluded from the extracted removal candidate edges. Thus, a removal target edge image 150 is generated. In the removal target edge image 150, the edge 14 is a removal target edge, while the edges 27 to 29 are excluded as pair-edges.

The removal target edge image 150 is used to remove the edge 14 of the self-shade 12 from the edge image 20. More specifically, the removal target edges remaining in the removal target edge image 150 are removed from the edge image 20, and a pair-exclusion-edge-removed image 155 is generated. The movement amount estimation device 50 estimates a movement amount based on two pair-exclusion-edge-removed images, such as the pair-exclusion-edge-removed image 155, which are generated from images taken at two different clock times.

Figure 8:
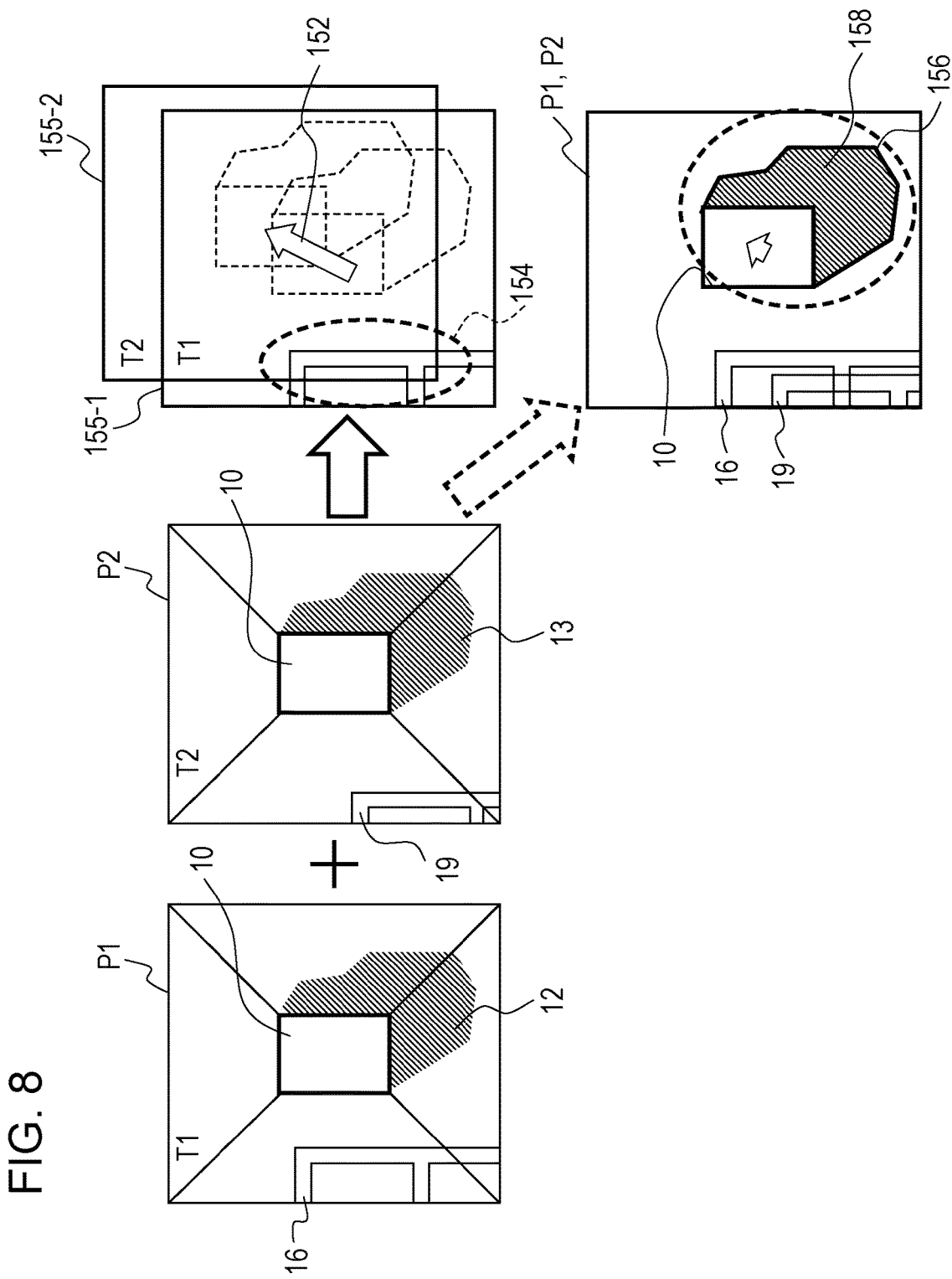
FIG. 8 is a view illustrating one example of movement amount estimation according to the second embodiment.

FIG. 8 is a view illustrating one example of movement amount estimation according to the second embodiment. As illustrated in FIG. 8, a first image P1 and a second image P2 are used in the movement amount estimation device 50. The first image P1 and the second image P2 are road surface projection images which are each generated based on camera images of the surroundings taken at different clock times by at least one camera provided on a mobile body. Furthermore, for each of the first image P1 and the second image P2, a pair-exclusion-edge-removed image 155-1 and a pair-exclusion-edge-removed image 155-2 are generated through generation of the edge image and the removal target edge image, as described above. A movement amount 152 is estimated by matching these pair-exclusion-edge-removed images. Then, since a self-shade 12 and a self-shade 13 have been removed, as in an area 154, the image matching is performed with high accuracy based on a white line 16 and a white line 19.

On the one hand, as a comparative example is described a case in which image matching of the first image P1 and the second image P2 is performed without using the pair-exclusion-edge-removed image 155. In such a case, as in an area 156, the self-shade 12 and the self-shade 13 in the two images are almost overlapping. Thus, for example, in image matching, as in a self-shade 158, the self-shade 12 and the self-shade 13 in the two images match, which makes it difficult to estimate an accurate amount of movement. In such a case, is also possible a method for attempting to remove the self-shade 12 by utilizing the fact that the self-shade 12 scarcely moves and removing a motionless part from the image. However, the method for removing a motionless part even removes a road surface pattern parallel to a traveling direction, which makes it difficult to estimate an accurate amount of movement. With the movement amount estimation device 50 according to the second embodiment, since the white line 16 and the white line 19 are excluded from the removal targets, a movement amount may be estimated with high accuracy.

Estimation of a movement amount according to the second embodiment is further described in detail hereinafter. The first image P1 and the second image P2 used in the movement amount estimation device 50 are generated by taking images of the surroundings at different clock times by at least one or more camera provided on the mobile body and synthesizing the images into road surface projection images. Then, arrangement of the at least one or more camera may be stored in advance in the storage unit 57.

Figure 9:
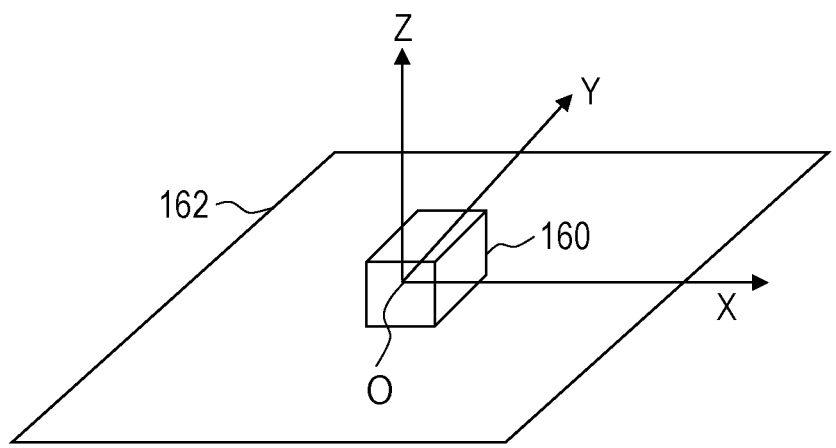
FIG. 9 is a view illustrating one example of a mobile body coordinate system according to the second embodiment.
Figure 10:
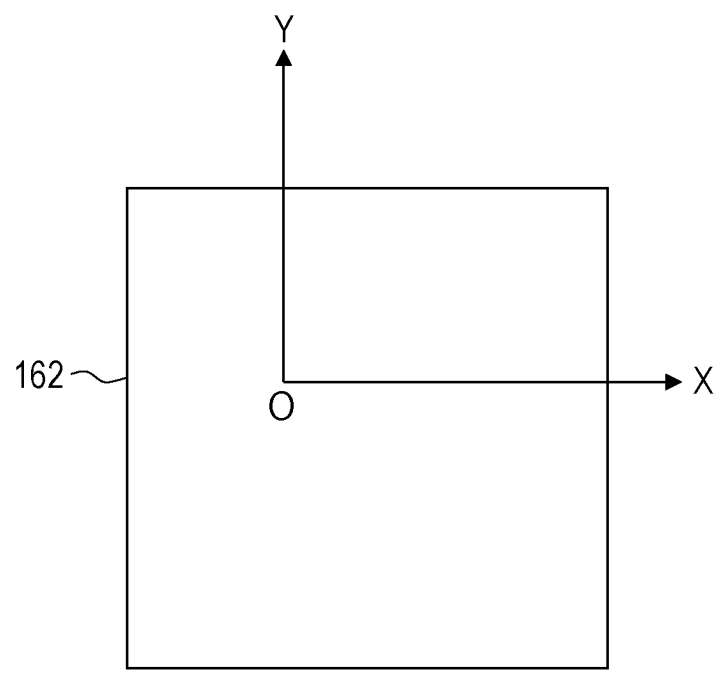
FIG. 10 is a view illustrating a road surface coordinate system according to the second embodiment.

Here, coordinates adopted in the movement amount estimation device 50 according to the second embodiment is described. FIG. 9 is a view illustrating one example of a mobile body coordinate system. As illustrated in FIG. 9, the mobile body coordinate system O-XYZ is a three-dimensional coordinate system in which a mobile body 160 is used as a reference. An origin O of the mobile body coordinate system is a point on a road surface 162 directly under the center of the mobile body 160. An X axis is a coordinate axis from the origin O to the right of the mobile body 160. A Y axis is a coordinate axis from the origin O to a front direction of the mobile body 160. A Z axis is a coordinate axis from the origin O to a upward direction of the road surface 162. FIG. 10 is a view illustrating a road surface coordinate system. As illustrated in FIG. 10, the road surface coordinate system O-XY is defined on an XY plane of the mobile body coordinate system.

Figure 11:
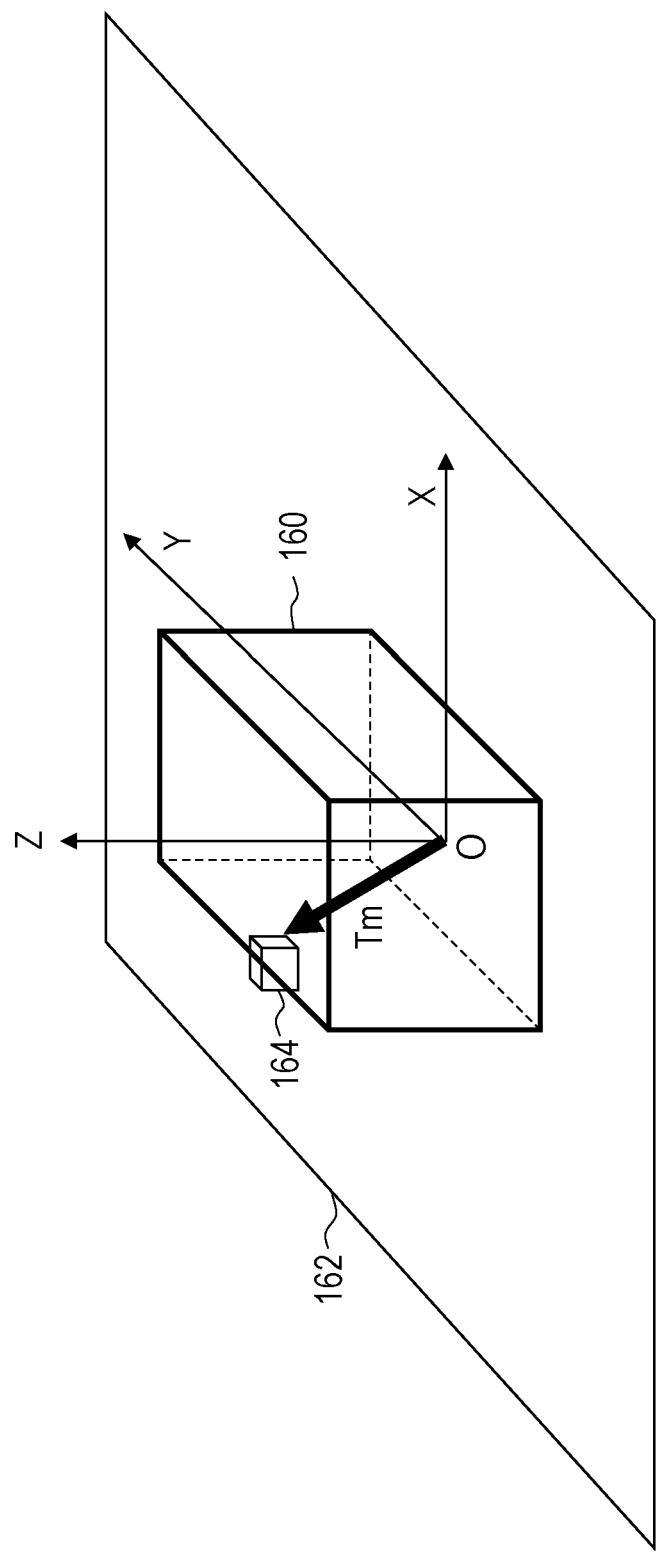
FIG. 11 is a view illustrating one example of a camera position and posture according to the second embodiment.

FIG. 11 is a view illustrating one example of a camera position and posture. As illustrated in FIG. 11, a position and posture of an m-th camera 164 (m is an integer of more than or equal to 1) mounted on the mobile body 160 may be represented by a translation vector Tm and a rotating matrix Rm in the mobile body coordinate system O-XYZ.

Figure 12:
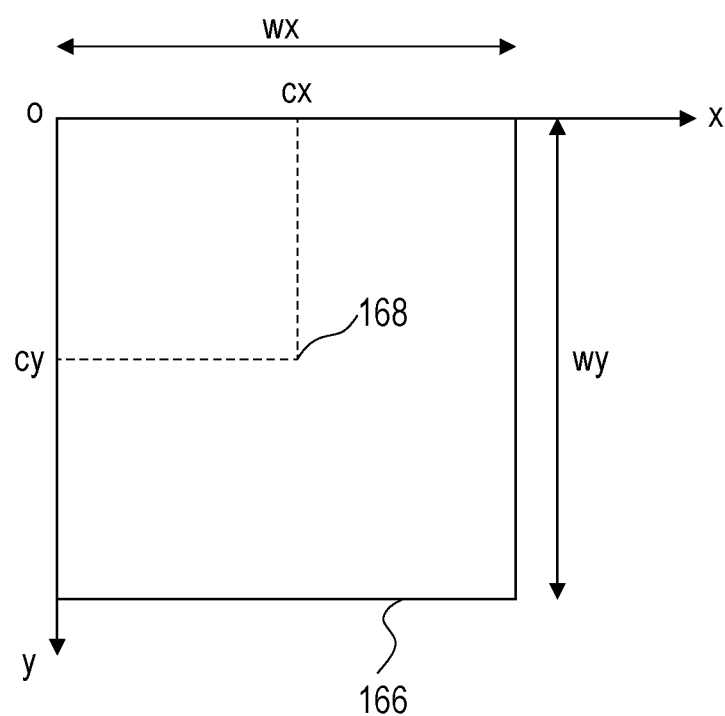
FIG. 12 is a view illustrating one example of a road surface projection image coordinate system according to the second embodiment.

FIG. 12 is a view illustrating one example of a road surface projection image coordinate system. As illustrated in FIG. 12, the road surface projection image coordinate system o-xy is a two-dimensional coordinate system of a road surface projection image 166. An origin o of the road surface projection image 166 may be an upper left apex of the road surface projection image 166, for example. Size of the road surface projection image 166 in the x axis direction is wx and size in the y axis direction is wy. Note that the size wx may be the number of pixels in the x axis direction and the size wy may be the number of pixels in the y axis direction. When coordinates of the center 168 of the road surface projection image 166 is (cx, cy), the following expression 1 and expression 2 may be formed.

$cx=wx/2$ (Expression 1)

$cy=wy/2$ (Expression 2)

Figure 13:
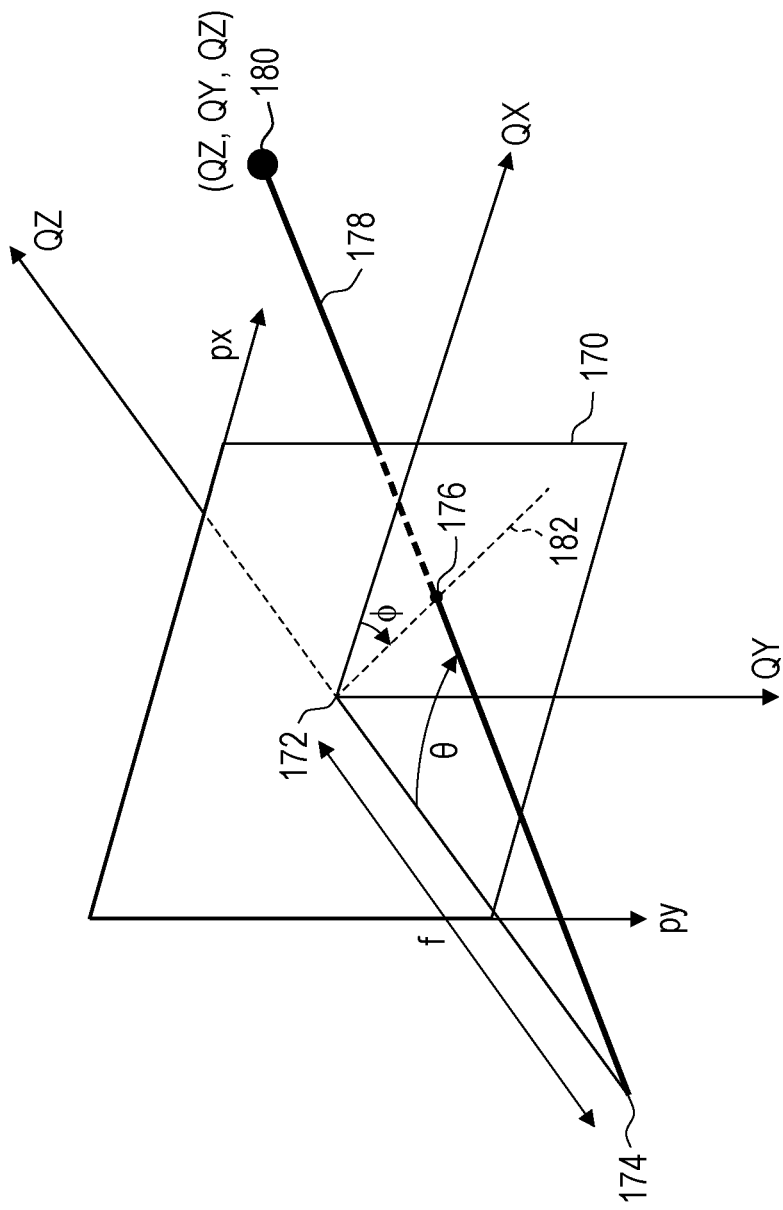
FIG. 13 is a view illustrating one example of a camera coordinate system according to the second embodiment.

FIG. 13 is a view illustrating one example of a camera coordinate system. A camera image coordinate system px-py of FIG. 13 is a two-dimensional coordinate system of a camera image 170 on an imaged surface of the camera 164. A px axis is a coordinate axis in a horizontal direction of the camera image 170 and a py axis is a coordinate axis in a vertical direction of the camera image 170.

A camera coordinate system QX-QY-QZ is a three-dimensional coordinate system having the center 172 of the camera image 170 as an origin. A QZ axis is on an optical axis of the camera 164, and a QX axis and a QY axis are on a plane perpendicular to the optical axis. Connecting a point 174 and a point 180 with a straight line 178, the straight line 178 intersects with the camera image 170 at an intersection point 176, where the point 174 is a point away from the center 172 in a negative direction of the QZ axis for a focal distance f of the camera 164 and the point 180 is a point on an object as an imaging target of the camera 164. Then, the point 180 on the object is projected to the intersection point 176 on the camera image 170.

Assume that coordinates of the point 180 on the object are (QX, QY, QZ), angle made by the QZ axis and the straight line 178 is angle θ, and angle made by the QX axis and a straight line 182 connecting the center 172 with the intersection point 176 is angle φ. Assume that coordinates of the center 172 in the camera image coordinate system px-py are (vx, vy), coordinates of the point 176 on the camera image 170 are (px, py), and a pixel value of pixels corresponding to the point 176 is pm (px, py). In addition, assume that actual size on the road surface 162 corresponding to size in the x axis direction of one pixel of the road surface projection image 166 is MX, and actual size on the road surface 162 corresponding to size in the y direction of one pixel of the road surface projection image 166 is MY.

Removal candidate edge extraction is described hereinafter. When an edge image is generated based on a generated road surface projection image, a general differential operator such as Sobel, for example, is caused to act on the road surface projection image to determine edge intensity corresponding to each pixel. For example, in the embodiment, assume that a Sobel filter expressed by the following expression 3 and expression 4 is used as a differential operator. Note that a filter Sh is a filter which calculates horizontal edge intensity Eh in the x axis direction in the road surface projection image, for example. A filter Sv is a filter which calculates vertical edge intensity Ev in the y axis direction in the road surface projection image, for example.

$$Sh = \begin{pmatrix} -1 & 0 & 1 \\ -2 & 0 & 2 \\ -1 & 0 & 1 \end{pmatrix}$$ (Expression 3)

$$Sv = \begin{pmatrix} -1 & -2 & -1 \\ 0 & 0 & 0 \\ 1 & 2 & 1 \end{pmatrix}$$ (Expression 4)

Figure 14:
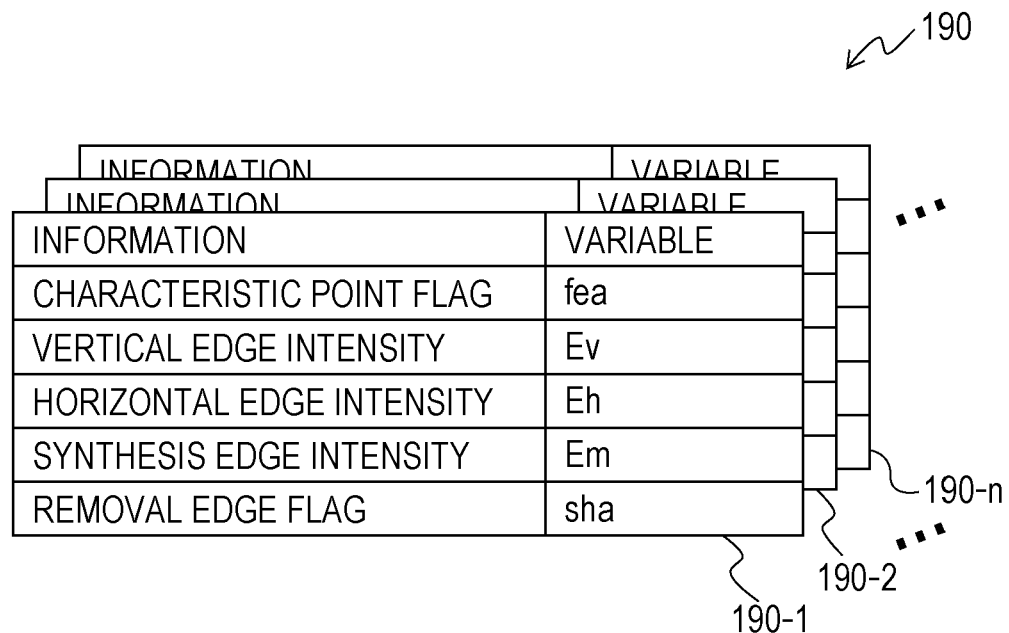
FIG. 14 is a view illustrating one example of an edge list according to the second embodiment.

FIG. 14 is a view illustrating one example of an edge list 190. The edge list 190 is generated corresponding to each pixel in the edge image 20, for example. In FIG. 14, edge lists 190-1, 190-2, . . . , 190-n (n is the number of pixels in the edge image) are expressed corresponding to each edge e(1,1), e(2, 1), . . . , e(j, i), . . . . The edge lists 190-1, 190-2, . . . , 190-n are also referred to as the edge list 190 collectively or as a representative. Note that a variable i is a variable indicating the number of pixels in the vertical direction of the edge image and a variable j is a variable indicating the number of pixels in the horizontal direction of the edge image.

The edge list 190 includes a characteristic point flag fea, vertical edge intensity Ev, horizontal edge intensity Eh, synthesis edge intensity Em, and a removal edge flag sha. The edge list 190 is generated by the removal candidate edge extraction unit 51, the pair-edge exclusion unit 53, and the pair exclusion removal unit 55, for example. Note that the vertical edge intensity Ev is calculated using, for example, the above-mentioned filter Sv, for each pixel. The horizontal edge intensity Eh is calculated using, for example, the above-mentioned filter Sh, for each pixel. In addition, here, the synthesis edge intensity Em is calculated with the following expression 5.

$$Em = \text{SQRT}(Eh^2 + Ev^2) \quad \text{(Expression 5)}$$

The characteristic point flag fea is information indicating whether or not the synthesis edge intensity Em is more than or equal to a predetermined threshold. For example, when the synthesis edge intensity Em is more than or equal to the threshold, it is considered that the characteristic point flag fea="1", and the vertical edge intensity Ev and the horizontal edge intensity Eh are registered in the edge list 190. When the synthesis edge intensity Em is less than the threshold, it is set as the characteristic point flag fea="0". With the differential processing as described above, an edge image representative of intensity change, such as the edge image 20, for example, may be obtained.

The removal edge flag sha is information indicating whether or not a corresponding edge is the removal target edge. When it is judged that the corresponding edge is the removal target edge, the removal edge flag sha="1", for example. When the corresponding edge is not the removal target edge, the removal edge flag sha="0", for example. The edge list 190 is stored in the storage unit 57, for example.

Note that the edge list 190 is one example, and an edge list is not limited to this edge list 190. For example, the characteristic point flag fea may be dispensed with. When there is the characteristic point flag fea, processing time may be reduced in processing to be described below when data processing of which is dispensed with depending on the characteristic point flag fea is present.

Whether or not the corresponding edge is the removal target edge is judged by the edge removal unit 30 based on the vertical edge intensity Ev and the horizontal edge intensity Eh in the edge list 190, and a position of an edge on the image, for the edge image 20, for example. An example of a method for judging a removal candidate edge is described hereinafter.

When it is assumed that the road surface projection image coordinates and the center coordinates of the road surface projection image are (x,y) and (cx, cy) respectively, a position vector p from the origin O of the mobile body coordinate is expressed as follows.

$$p = (p(0), p(1)) \quad \text{(Expression 6)}$$

$$p(0) = x - cx \quad \text{(Expression 7)}$$

$$p(1) = -(y - cy) \quad \text{(Expression 8)}$$

In addition, an edge direction vector g whose brightness change direction viewed in the radial direction is from darkness to bright is expressed as follows.

$$g = (g(0), g(1)) \quad \text{(Expression 9)}$$

$$g(0) = Eh \quad \text{(Expression 10)}$$

$$g(1) = -Ev \quad \text{(Expression 11)}$$

When it is assumed that angle made by the position vector p and the edge direction vector g is angle ψ, the angle ψ is expressed with the vector p and the vector g by the following expression 20. Note that the angle ψ is also referred to as edge gradient ψ.

$$\cos\Psi = \frac{p \cdot g}{|p||g|} = \frac{p(0)g(0) + p(1)g(1)}{\sqrt{p(0)^2 + p(1)^2}\sqrt{g(0)^2 + g(1)^2}} \quad \text{(Expression 12)}$$

Here, when the edge gradient ψ is within a predetermined angle range, an edge change direction viewed from the mobile body coordinate origin O in the radial direction is the darkness-brightness direction from darkness to brightness. Thus, the removal candidate edge extraction unit 51 judges that the corresponding edge is the removal candidate edge. For example, a range of the edge gradient ψ for determining as the removal candidate edge is such that −th1≤ψ≤+th1. The angle th1 may be positive angle of equal to or less than 90 degrees, and may be 45 degrees by way of example.

When the brightness change direction in an edge is the darkness-brightness direction in the edge list 190, the removal candidate edge extraction unit 51 indicates that the edge is the removal candidate edge, by making the removal edge flag sha="1" for the edge, for example. Then, the removal candidate edge extraction unit 51 sets the edge intensity Em of the edge to a positive value. When the brightness change direction in the edge is not the darkness-brightness direction in the edge list 190, the removal candidate edge extraction unit 51 sets the removal edge flag sha="0", for example. Then, the removal candidate edge extraction unit 51 sets the edge intensity Em of the edge to a negative value. The removal candidate edge is extracted as described above, for example.

Figure 15:
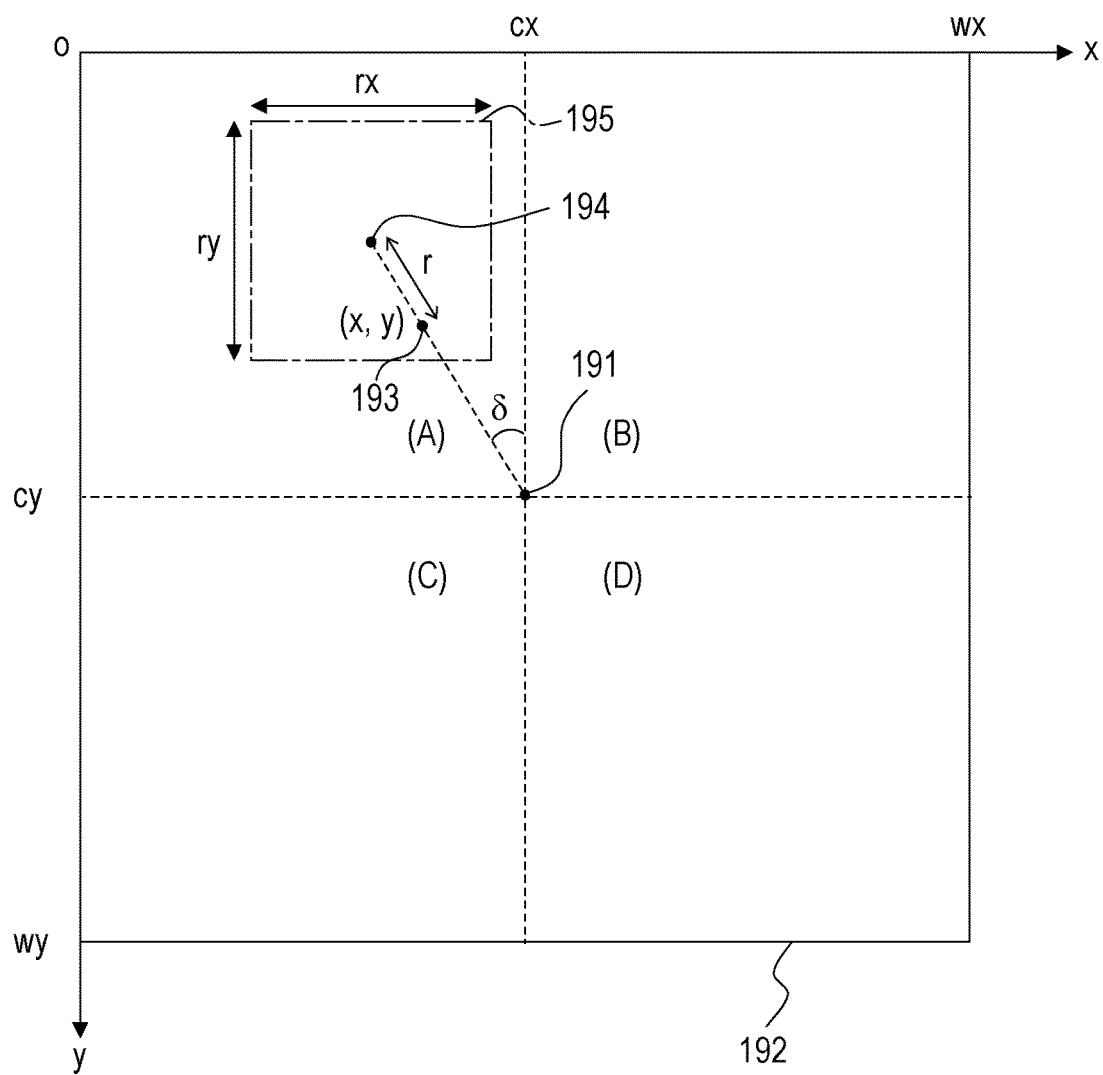
FIG. 15 is a view illustrating one example of a predetermined area setting method according to the second embodiment.

FIG. 15 is a view illustrating one example of a predetermined area setting method. A predetermined area is an area on which judgment is made to exclude an edge from removal candidate edge when the removal candidate edge is the edge associated with a white line. The predetermined area is set by the pair-edge exclusion unit 53 for the removal candidate edge extracted by the removal candidate edge extraction unit 51, based on a position of the removal candidate edge and a direction from the center of a road surface projection image. The predetermined area is set for the removal candidate edge for which the removal edge flag sha="1", for example, in the edge list 190. The removal candidate edge which is a target of setting of the predetermined area is referred to as a set edge.

Assume that coordinates of a set edge on a road surface projection image are coordinates (x,y). Assume that center coordinates of a predetermined area are coordinates (rcx, rcy), and the predetermined area is a rectangular area having size of rx×ry. Assume that a distance r is a value for which the set edge is included in the predetermined area. In addition, the size rx×ry is preferably size that is determined based on width of a white line, for example. For example, length rx and length ry may be set to about twice of the width of the white line, for example. For example, it may be provided that a white line, which is one of white patterns, includes edges which are parallel lines and that the line width is 10 to 20 centimeters. In such a case, r may be r=10 cm, by way of example, and rx and ry may be rx=ry=40 cm, by way of example. However, r, rx, and ry may not be limited to this.

In addition, a white line is brighter (intensity is higher) than the road surface, and has uniform brightness. Thus, a brightness-darkness pattern of an edge associated with the white line is the darkness-brightness direction and brightness-darkness direction when viewed from the center of a mobile body, and an amount in change of brightness in each of the darkness-brightness direction and brightness-darkness direction is almost same. In contrast in the neighborhood of a self-shade, there is no combination of brightness and darkness, and only the brightness-darkness direction pattern. Assume that angle δ is positive angle of less than or equal to 90 degrees made by a straight line connecting the center of the road surface projection image with the coordinate (x,y) of the set edge and the y axis.

Then, the predetermined areas are set as follows.

$$rcx = x + r \times \sin \delta \times sx \quad \text{(Expression 13)}$$

$$rcy = y + r \times \cos \delta \times sy \quad \text{(Expression 14)}$$

However, the variables sx, sy are given under the following conditions (A) to (D).

$$0 \le x < cx, 0 \le y < cy : sx = -1, sy = -1 \quad \text{(A)}$$

$$cx \le x < wx, 0 \le y < cy : sx = +1, sy = -1 \quad \text{(B)}$$

$$0 \le x < cx, cy \le y < wy : sx = -1, sy = +1 \quad \text{(C)}$$

$$cx \le x < wx, cy \le y < wy : sx = +1, sy = +1 \quad \text{(D)}$$

The above conditions vary depending on definitions of the coordinate axis and the angle δ. The predetermined area in the second embodiment is set as a predetermined area which is on the straight line in the radial direction, connecting the center of the road surface projection image with the corresponding set edge, and which has, as the center, a point which is away from the center of the road surface projection image.

In the example of FIG. 15, a road surface projection image 192 is divided to four areas of same dimensions relative to the center 191. Each area is an area corresponding to the above conditions (A) to (D). An edge 193 is in an area corresponding to the condition (A). For example, when the edge 193 is a set edge, a predetermined area 195 is defined as a predetermined area 195 with respect to the center 194 which is calculated by the expression 13 and the expression 14. Here, a distance r is a distance from the edge 193 to the center 194, and determined in advance so that the edge 193 is included in the predetermined area 195.

In this predetermined area, it is judged whether or not the corresponding set edge is a pair-edge. More specifically, when the predetermined area includes a white line, it is considered that a darkness-brightness direction edge and a brightness-darkness direction edge are present at a ratio close to 1 to 1, for example, and make a pair. Thus, it is expected that a value of average edge intensity Eave considering the change direction of the brightness or the darkness in the predetermined area is small. Then, when the average edge intensity Eave in the predetermined area is smaller than a predetermined threshold, it is judged that the corresponding set edge is a pair-edge connected to the white line and excluded from the removal candidate edges. Then, the pair-edge exclusion unit 53 makes the removal edge flag sha="0", for example, in the edge list 190, for the set edge that is judged to be the pair-edge.

Note that a predetermined area is not limited to the above. It is preferable that a predetermined area includes a set edge and is close to the set edge, and the maximum width of the predetermined area is larger than width of a white line. In addition, a shape of the predetermined area is not limited to a rectangle and may be of other shape. When the predetermined area is rectangular, the above each side is parallel to the vertical axis or the horizontal axis of the edge image. However, for example, the predetermined area may be a rectangle having sides parallel to the brightness change direction in the set edge. In addition, the predetermined area may be an integral number of areas into which the edge image is divided.

The pair-edge exclusion unit 53 calculates the average edge intensity Eave with the following expression 15 by, for example, calculating a sum of the edge intensities Em of edge points in the predetermined area and normalizing the number of edges k (k is an integer of more than or equal to 1) having the edge intensities.

$$Eave = \Sigma Em/k \quad \text{(Expression 15)}$$

When this average edge intensity Eave is equal to or less than a threshold, it is judged that a darkness-brightness direction edge (positive value) and other edge (negative edge) are mutually offset. More specifically, the pair-edge exclusion unit 53 judges that the set edge is a pair-edge. Then, by setting size of the predetermined area to a value corresponding to width size of the white line, it is judged that the pair-edge is the edge associated with the white line. The value corresponding to the width size of the white line may be size in which standard white line width may fit in a predetermined area, for example. When a predetermined area is a square, the value corresponding to the width size of the white line may be a value determined based on width size, such as making length of one side the integral multiple of the standard white line width. Thus, the pair-edge exclusion unit 53 may avoid removal of a white line pattern on a road surface, by excluding pair-edges from removal candidate edges.

For example, a range of the average edge intensity for judging on a pair-edge may be a range that meets the following expression 16, for the edge intensity Em of the set edge.

$$Eave \le Em/4 \quad \text{(Expression 16)}$$

In the edge list 190, the removal edge flag sha is information indicating whether or not an edge is an edge corresponding to the removal target edge image 150. Thus, the pair-edge exclusion unit 53 judges that a set edge which meets the expression 16 as a pair-edge, and makes the corresponding removal edge flag sha="0". When the set edge is not a pair-edge, the pair-edge exclusion unit 53 makes the corresponding removal edge flag sha="1". The movement amount estimation device 50 generates each edge list 190 in the first image P1 and the second image P2 which are taken at two different clock times, as described above. The generated edge list 190 is information corresponding to the pair-exclusion-edge-removed image 155.

Figure 16:
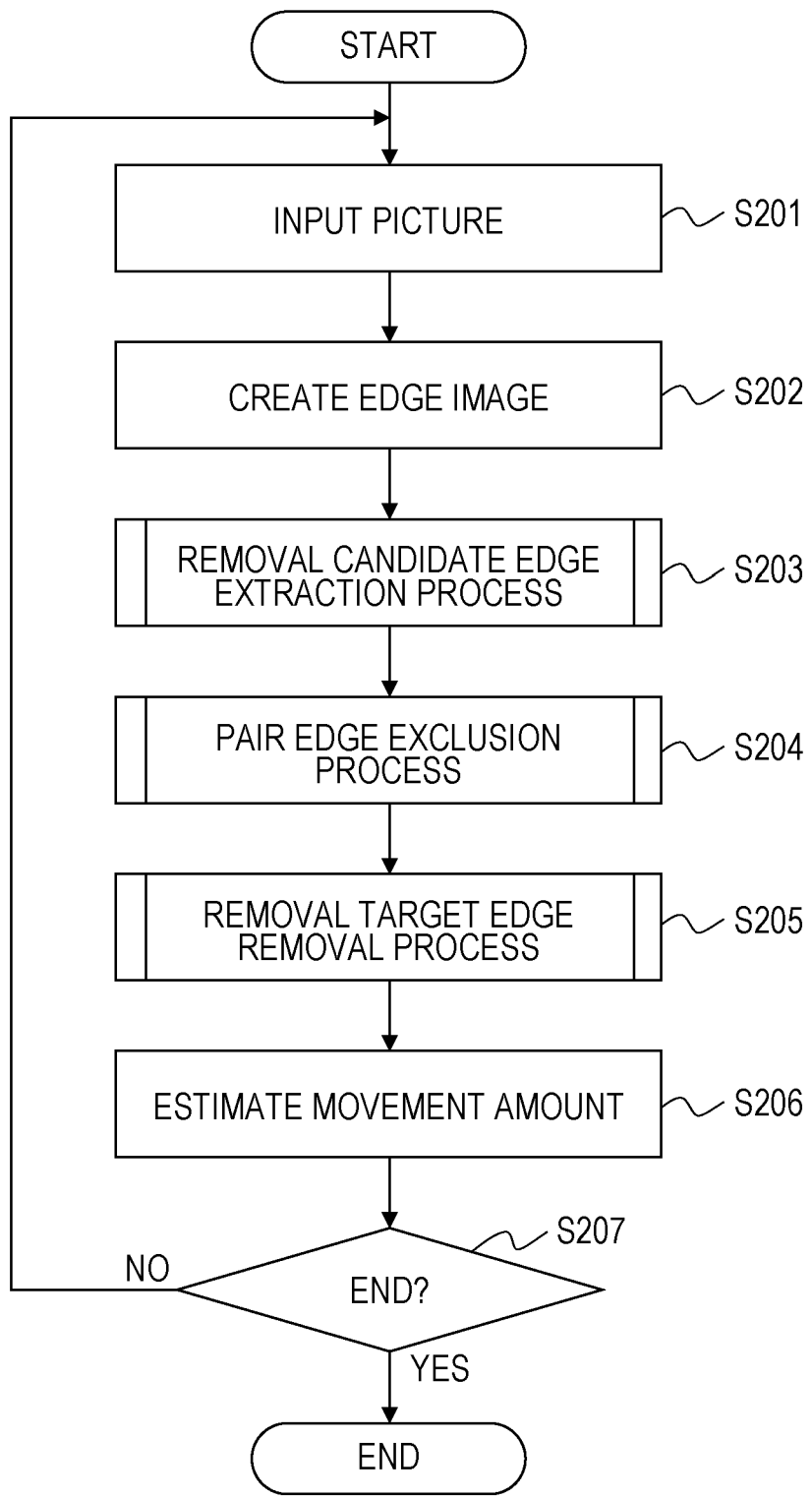
FIG. 16 is a flow chart illustrating one example of main operations of a movement amount estimation device according to the second embodiment.

Processing in the movement amount estimation device 50 is further described hereinafter with reference to FIG. 16 to FIG. 19. FIG. 16 is a flow chart illustrating one example of main operations of the movement amount estimation device 50 according to the second embodiment. As illustrated in FIG. 16, a picture or an image is inputted to the movement amount estimation device 50 (S201). Then, camera images acquired by at least one camera provided on a mobile body at two different clock times are used, as described above. Assume that an edge image is generated by performing differential processing on each road surface projection image generated based on each camera image (S202).

The removal candidate edge extraction unit 51 performs a removal candidate edge extraction process (S203). Details are described below with reference to FIG. 17. The pair-edge exclusion unit 53 performs a process to exclude an edge, as a pair-edge, associated with a white line drawn on a road surface (S204). Details are described below with reference to FIG. 18. The pair exclusion removal unit 55 performs a process to remove from the edge images removal target edges from which the pair-edges are removed (S205). Details are described below with reference to FIG. 19.

A movement distance is estimated using the edge images which are outputted from the movement amount estimation device 50 and from which a self-shade is removed based on the images taken at two different clock images (S206). When an instruction to end is not inputted (S207: NO), processing is repeated from S201. When the instruction to end is inputted (S207: YES), the processing ends.

Figure 17:
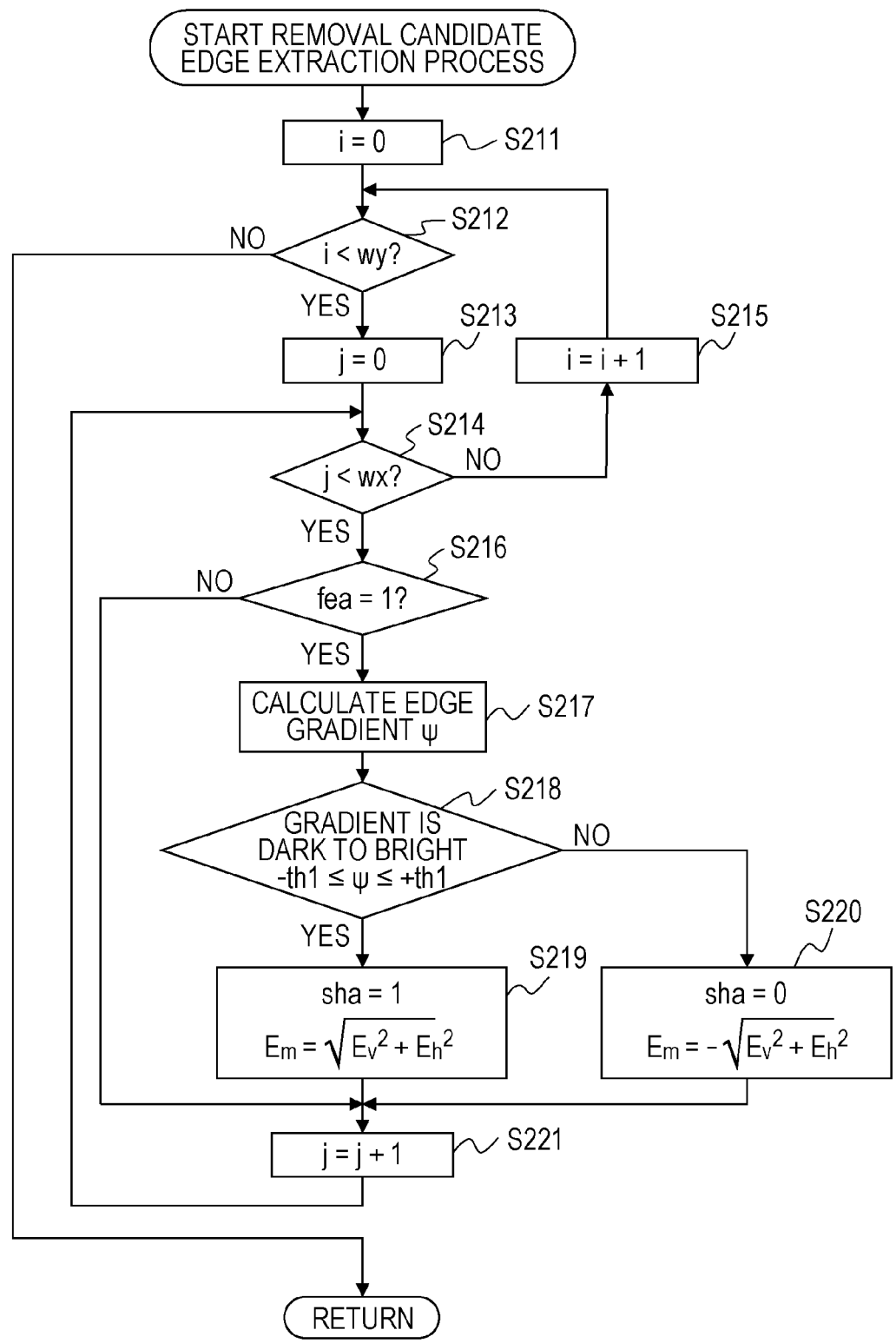
FIG. 17 is a flow chart illustrating one example of a removal candidate edge extraction process according to the second embodiment.

FIG. 17 is a flow chart illustrating one example of a removal candidate edge extraction process according to the second embodiment. As illustrated in FIG. 17, the removal candidate edge extraction unit 1 sets the variable i=0 (S211). When the variable i is not i<wy (wy is the number of pixels in the y direction of the road surface projection image) (S212: NO), the removal candidate edge extraction unit 51 returns the processing to the processing of FIG. 16. When the variable i is i<wy (S212: YES), the removal candidate edge extraction unit 51 sets the variable j=0 (S213).

When the variable j is not j<wx (wx is the number of pixels in the x direction of the road surface projection image) (S214: NO), the removal candidate edge extraction unit 51 sets i=i+1 (S215) and returns the processing to S212. When the variable j is j<wx (S214: YES), the removal candidate edge extraction unit 51 judges in the edge list 190 corresponding to the pixel whether or not the characteristic point flag fea="1" (S216).

When the characteristic point flag is not fea="1" (S216: NO), the removal candidate edge extraction unit 51 shifts the processing to S221. When the characteristic point flag is fea="1" (S216: YES), the removal candidate edge extraction unit 51 calculates edge gradient $\psi$ (S217). More specifically, the removal candidate edge extraction unit 51 calculates the edge gradient $\psi$ based on the expression 12.

The removal candidate edge extraction unit 51 judges whether or not the calculated edge gradient $\psi$ falls within a predetermined angle range that has already been defined (S218). In this example, it is judged whether or not the predefined threshold th1 meets $-th1 \leq \psi \leq th1$. When the predefined threshold th1 meets the condition in S218 (S218: YES), the removal candidate edge extraction unit 51 sets the removal edge flag sha="1" in the edge list 190. In addition, the removal candidate edge extraction unit 51 calculates the synthesis edge intensity Em from the above-mentioned expression 5 and stores the synthesis edge intensity Em in the edge list 190 (S219).

When the predefined threshold th1 does not meet the condition in S218 (S218: NO), the removal candidate edge extraction unit 51 sets the removal edge flag sha="0" in the edge list 190. In addition, the removal candidate edge extraction unit 51 calculates the synthesis edge intensity Em from the following expression 17a and stores the synthesis edge intensity Em in the edge list 190 (S220).

$$Em = -\sqrt{Eh^2 + Ev^2} \qquad \text{(Expression 17a)}$$

In S221, the removal candidate edge extraction unit 51 sets j=j+1 and returns the processing to S214. With the processing described above, the removal candidate edge is extracted.

Figure 18:
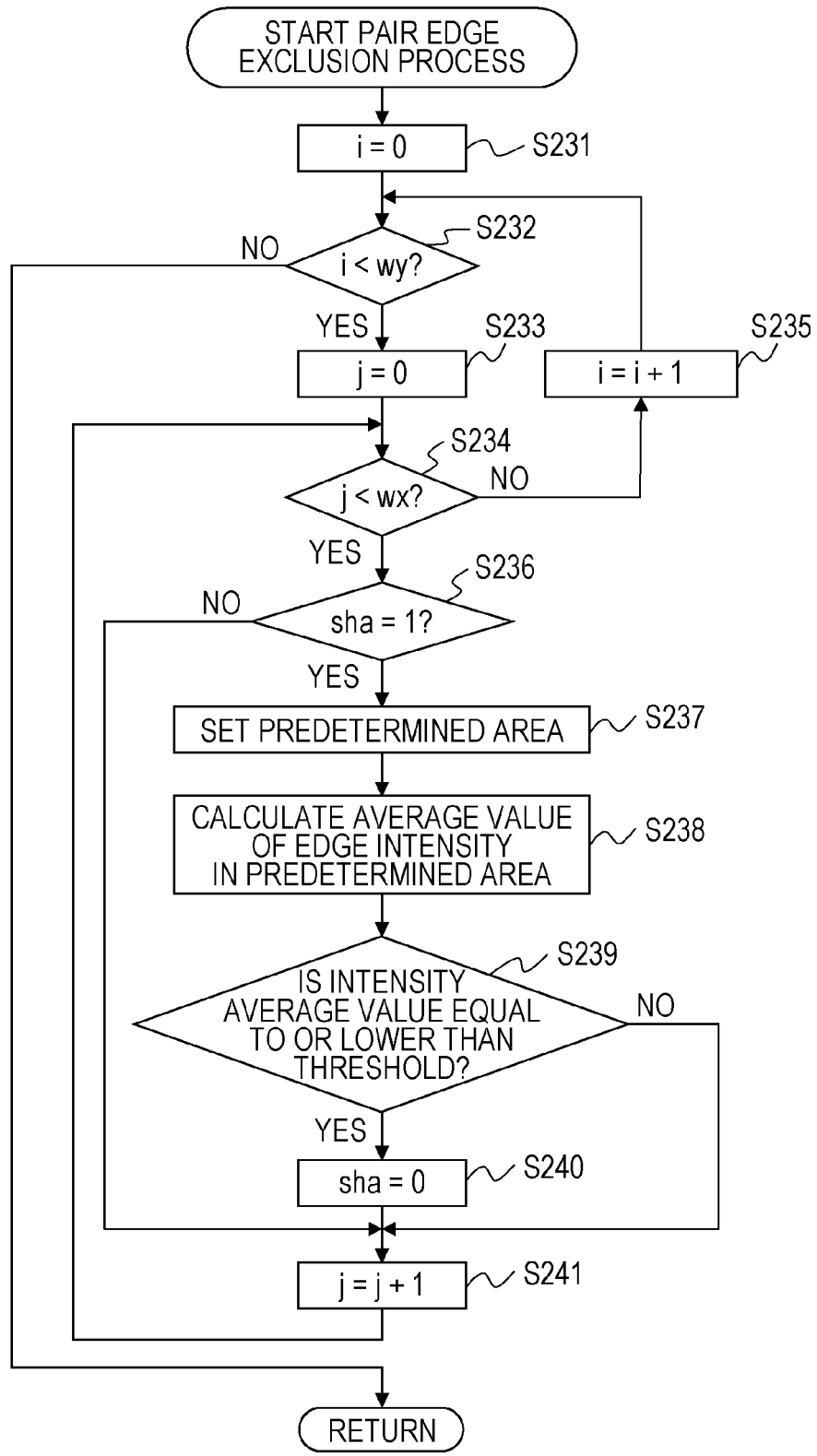
FIG. 18 is a flow chart illustrating one example of a pair-edge exclusion process according to the second embodiment.

FIG. 18 is a flow chart illustrating one example of a pair-edge exclusion process according to the second embodiment. The pair-edge exclusion unit 53 sets the variable i=0 (S231). When the variable i is not i<wy (wy is the number of pixels in the y direction of the road surface projection image) (S232: NO), the pair-edge exclusion unit 53 returns the processing to the processing of FIG. 16. When the variable i is i<wy (S232: YES), the pair-edge exclusion unit 53 sets the variable j=0 (S233).

When the variable j is not j<wx (wx is the number of pixels in the x direction of the road surface projection image) (S234) NO), the pair-edge exclusion unit 53 sets i=i+1 (S235) and returns the processing to S232. When the variable j is j<wx (S234: YES), the pair-edge exclusion unit 53 judges in the edge list 190 corresponding to the edge whether or not the removal edge flag sha="1" (S236).

When the removal edge flag corresponding to the edge is not sha="1" (S236: NO), the pair-edge exclusion unit 53 shifts the processing to S242. When the removal edge flag corresponding to the edge is sha="1" (S236: YES), the pair-edge exclusion unit 53 sets a predetermined area (S237). More specifically, the pair-edge exclusion unit 53 sets a predetermined area based on, for example, a position of the edge (any of the areas (A) to (D)) and the expressions 13 and 14. The pair-edge exclusion unit 53 further calculates an average value Eave of the edge intensities in the predetermined area, based on the expression 15, for example (S238).

The pair-edge exclusion unit 53 judges whether or not the calculated average value Eave of the edge intensities is less than or equal to a predetermined value that has been already defined (S239). In this example, for example, it is judged whether or not the expression 16 is met. When the expression 16 is met (S239: YES), the pair-edge exclusion unit 53 sets the removal edge flag sha="0" in the edge list 190 (S240). This means that it is then judged the corresponding set edge is a pair-edge.

When the expression 16 is not met (S239: NO), the pair-edge exclusion unit 53 shifts the processing to S241. It is judged that the set edge is the removal target edge. In S241, the pair-edge exclusion unit 53 sets j=j+1 and returns the processing to S234. With the processing described above, the process to exclude pair-edges is performed.

Figure 19:
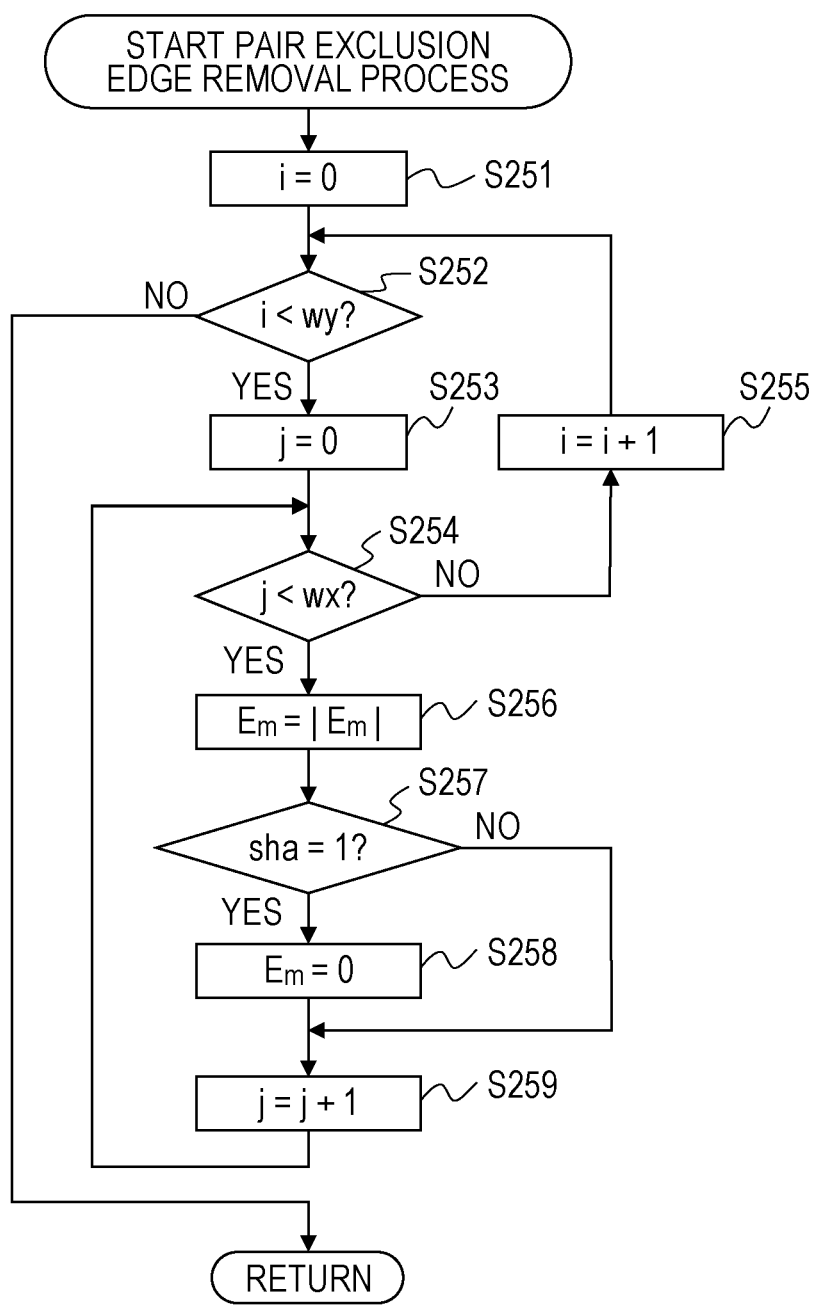
FIG. 19 is a flow chart illustrating one example of a removal target edge removal process according to the second embodiment.

FIG. 19 is a flow chart illustrating one example of a removal target edge removal process according to the second embodiment. In the second embodiment, the removal target edge removal process is a process to remove from edge images removal candidate edges (removal target edges) from which pair-edges are removed. The pair exclusion removal unit 55 sets the variable i=0 (S251). When the variable i is not i<wy (wy is the number of pixels in the y direction of the road surface projection image) (S252: NO), the pair exclusion removal unit 55 returns the processing to the processing of FIG. 16. When the variable i is i<wy (S252: YES), the pair exclusion removal unit 55 sets the variable j=0 (S253).

When the variable j is not j<wx (wx is the number of pixels in the x direction of the road surface projection image) (S254: NO), the pair exclusion removal unit 55 sets i=i+1 (S255) and returns the processing to S252. When the variable is j<wx (S254: YES), the pair exclusion removal unit 55 sets the synthesis edge intensity Em=|Em| in the edge list 190 corresponding to the edge (S256).

When the removal edge flag is not sha="1" (S257: NO), the pair exclusion removal unit 55 shifts the processing to S259. When the removal edge flag is sha="1" (S257: YES), the pair exclusion removal unit 55 sets the synthesis edge intensity Em=0 (S258). In S259, the pair exclusion removal unit 55 sets j=j+1 and returns the processing to S254. The edge list 190 after this processing is performed is, for example, information corresponding to the pair-exclusion-edge-removed image 155. As described above, a process to exclude the pair-edge from the removal candidate edge is performed to obtain the removal target edge.

As described above in detail, with the movement amount estimation device 50 according to the second embodiment, the removal candidate edge extraction unit 51 extracts removal target edges based on the brightness change direction judged in the edge images. The pair-edge exclusion unit 53 judges whether or not the set edge is a pair-edge in a predetermined area which includes the removal candidate edge to be the set edge and is close to the set edge. A pair-edge is a set edge that is judged to be associated with an edge in a relation of being mutually offset in a predetermined area. Whether or not a set edge is a pair-edge is judged by, for example, whether or not average edge intensity considering the brightness change direction is less than or equal to a predetermined value in a predetermined area. The pair-edge is construed as an edge associated with a white line on a road surface projection image.

The pair-edge exclusion unit 53 excludes the pair-edge from the removal candidate edges. The pair exclusion removal unit 55 sets the removal candidate edges in which a pair-edge is removed as the removal target edges and removes the removal target edges from the edge image. The movement amount estimation device 50 outputs an estimated movement amount based on a first pair-exclusion-edge-removed image and a second pair-exclusion-edge-removed image which are based on the images taken at mutually different clock times.

As described above, with the movement amount estimation device 50 according to the second embodiment, in addition to the effect of the movement amount estimation device 1 according to the first embodiment, a movement amount may be estimated with higher accuracy because an edge associated with a white line on a road surface is excluded from removal target edges. More specifically, when a movement amount is estimated, any effect of a self-shade may be removed while leaving the edge associated with the white line on the road surface. Thus, a movement amount may be estimated with high accuracy and in a stable manner, even when a self-shade by illuminating light (sunlight) is imaged. As such, in an image on which a movement amount is estimated, since a self-shade of a mobile body may be removed while leaving a white line on a road surface, excessive removal of road surface patterns may be avoided and accuracy of the movement amount estimation may be increased.

Variation Example of the Second Embodiment

A variation example of the second embodiment is described hereinafter. Same signs are assigned to a configuration and operation similar to the first embodiment or the second embodiment and an overlapping description is omitted. The variation example is another example of the method for setting a predetermined area in the second embodiment. Here, only the method for setting a predetermined area is described.

Figure 20:
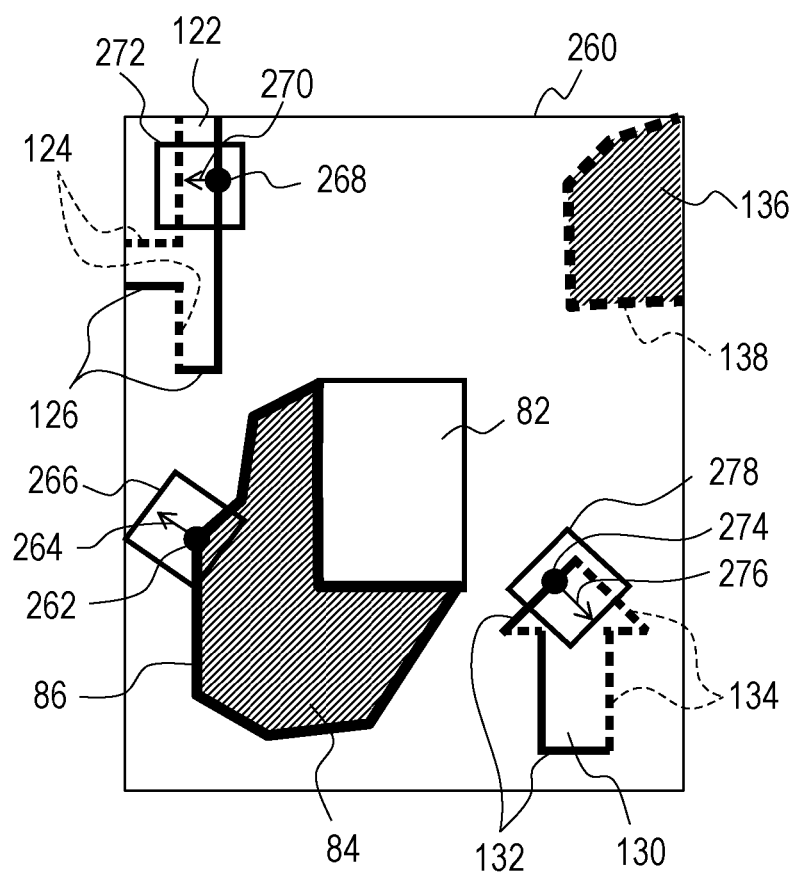
FIG. 20 is a view illustrating a predetermined area setting example according to a variation example of the second embodiment.

FIG. 20 is a view illustrating a predetermined area setting example according to a variation example of the second embodiment. A predetermined area setting example 260 is a setting example in the road surface projection image 120 which includes the white line 122, the white line 130, and the other shade 136 in addition to the mobile body 82. The darkness-brightness direction edges 124 and the brightness-darkness direction edges 126 are edges associated with the white line 122. The darkness-brightness direction edges 132 and the brightness-darkness direction edges 134 are edges associated with the white line 130. The brightness-darkness direction edges 138 are edges associated with the other shade 136.

In the predetermined area setting example 260, predetermined areas 266, 272, 278 are set. The predetermined area 266 is set to include a set edge, the removal candidate edge 262 of the self-shade 84 of the mobile body 82 being as the set edge. The predetermined area 266 is illustrated as an example of a predetermined area whose set edge is not a pair-edge. Assume, for example, that the removal candidate edge 262 is a darkness-brightness edge having edge gradient in a direction from darkness to brightness which is expressed by a change direction 264. Then, the predetermined area 266 is set to be a rectangular area having sides parallel to the change direction 264 and sides perpendicular to the change direction 264. In the predetermined area 260, when average edge intensity Eave considering the change direction exceeds a predetermined value, it is judged that the removal candidate edge 262, which is the darkness-brightness edge, includes no edge to be paired in the predetermined area 260. Then, it is judged that the removal candidate edge 262 associated with the predetermined area 260 is not a pair-edge and becomes a removal target edge.

The predetermined area 272 is set to include a set edge, the removal candidate edge 268 associated with the white line 122 being as the set edge. The predetermined area 272 is illustrated as an example of a predetermined area whose set edge is a pair-edge. Assume, for example, that the removal candidate edge 268 has edge gradient in a direction from darkness to brightness which is expressed by a change direction 270. Then, the predetermined area 272 is set to be a rectangular area having sides parallel to the change direction 270 and sides perpendicular to the change direction 270. In the predetermined area 272, when the average edge intensity Eave considering the change direction is less than or equal to the predetermined value, it is judged that the removal candidate edge 268, which is a darkness-brightness edge, is paired with any of brightness-darkness edges in the predetermined area 272. Then, it is judged that the removal candidate edge 268 associated with the predetermined area 272 is a pair-edge.

The predetermined area 278 is set to include a set edge, the removal candidate edge 274 associated with the white line 130 being as the set edge. The predetermined area 278 is illustrated as another example of the predetermined area whose set edge is a pair-edge. Assume, for example, that the removal candidate edge 274 has edge gradient in a direction from darkness to brightness which is expressed by a change direction 276. Then, the predetermined area 278 is set to be rectangular area having sides parallel to the change direction 276 and sides perpendicular to the change direction 276. In the predetermined area 278, when the average edge intensity Eave considering the change direction is less than or equal to the predetermined value, it is judged that the removal candidate edge 274 is a paired with any of edges in the predetermined area 278. Then, it is judged that the removal candidate edge 274 associated with the predetermined area 278 is a pair-edge. Similarly, a predetermined area is set for each of extracted removal candidate edges, and it is judged in each predetermined area whether or not a set edge is a pair-edge.

As described above, according to the variation example, in addition to the effect of the movement amount estimation device 1 according to the first embodiment and the movement amount estimation device 50 according to the second embodiment, pair-edges may be excluded more efficiently. More specifically, in the variation example, since a predetermined area is set according to edge gradient, it is possible to efficiently include a white line in the predetermined area. Thus, a pair-edge may be excluded from removal candidate edges with higher accuracy, and a movement amount may be estimated with higher accuracy.

Third Embodiment

A movement amount estimation device according to a third embodiment is described hereinafter. Same signs are assigned to a configuration and operation similar to the first embodiment, the second embodiment, and the variation example of the second embodiment, and an overlapping description is omitted.

The embodiment is another example of the method for setting a predetermined area in the second embodiment and the method for judging on a pair-edge. The movement amount estimation device according to the third embodiment includes a configuration similar to the movement amount estimation device 50 according to the second embodiment. Here, the method for setting a predetermined area and the method for judging on a pair-edge are only described.

Figure 21:
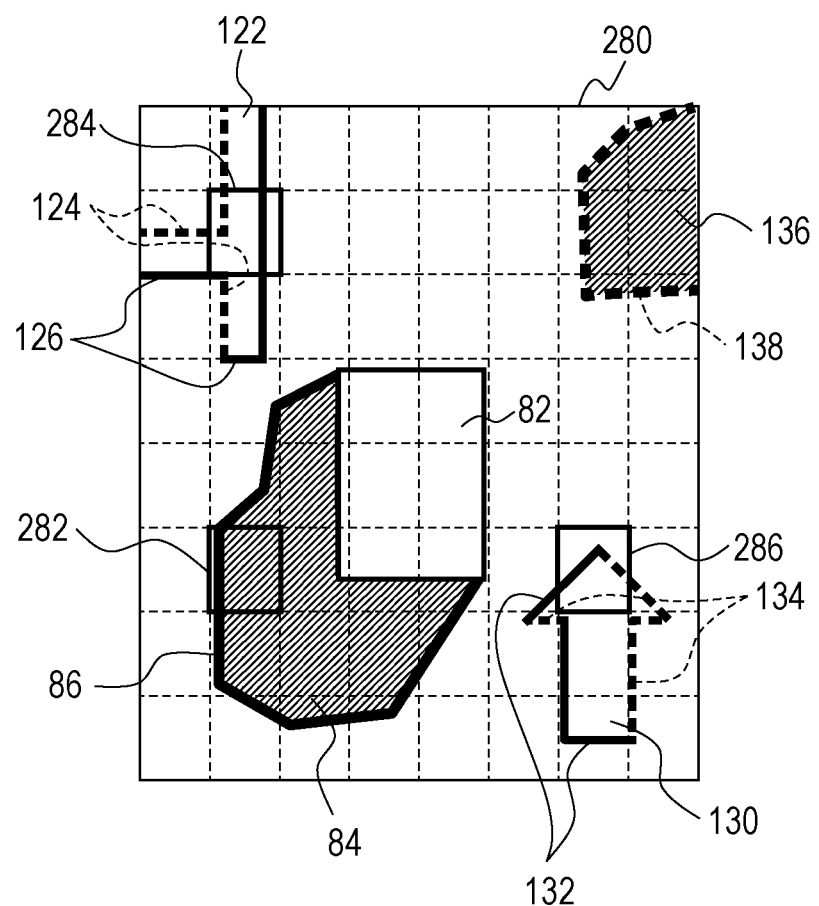
FIG. 21 is a view illustrating a predetermined area setting example according to a third embodiment.
Figure 22:
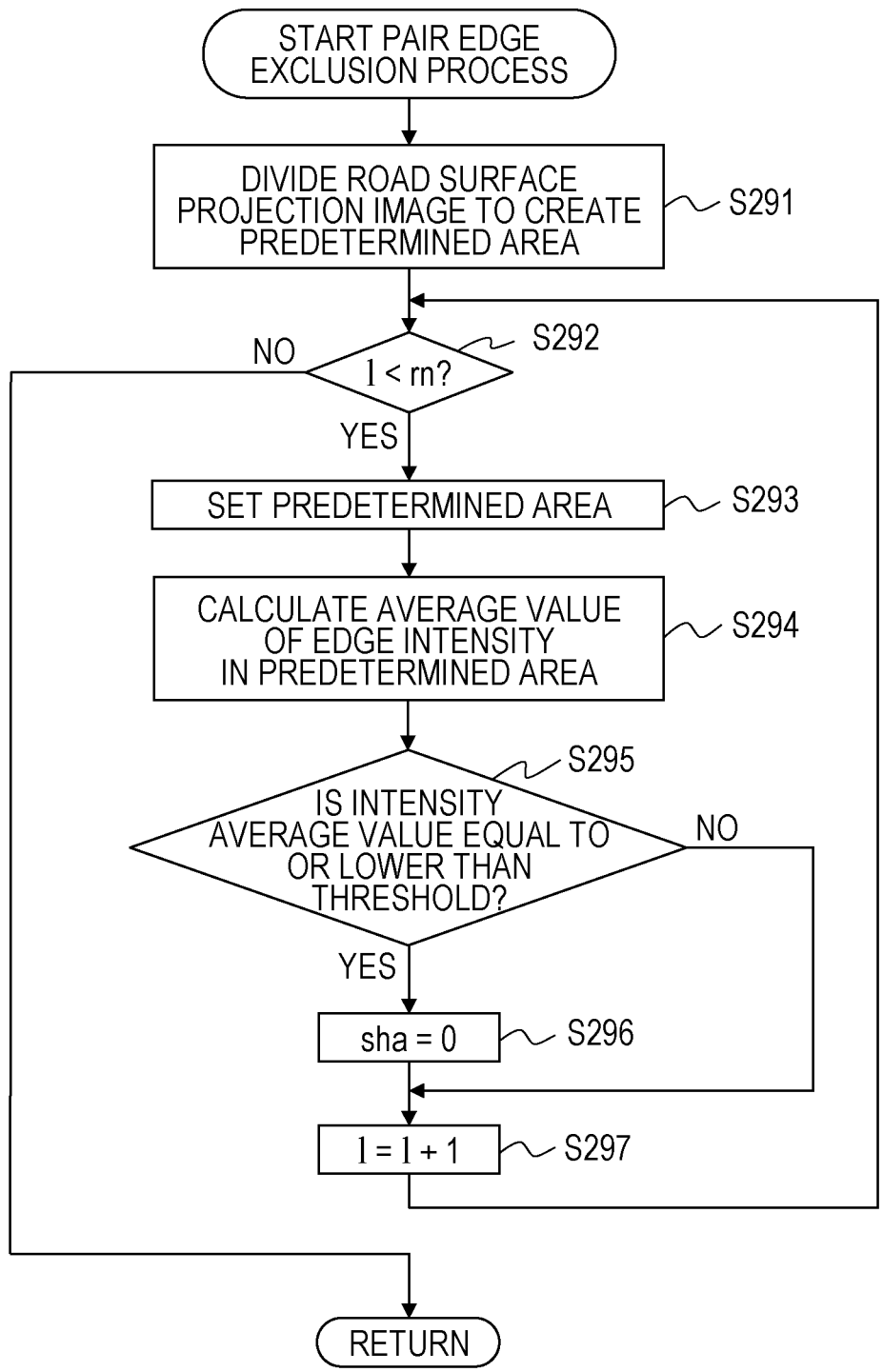
FIG. 22 is a flow chart illustrating one example of a pair-edge exclusion method in the predetermined area setting example according to the third embodiment.

FIG. 21 is a view illustrating a predetermined area setting example according to the third embodiment. FIG. 22 is a flow chart illustrating one example of a pair-edge exclusion method in a predetermined area setting example 280 according to the third embodiment.

As illustrated in FIG. 21, the predetermined area setting example 280 is a setting example in the road surface projection image 120 including the white line 122, the white line 130, and the other shade 136, in addition to the mobile body 82. The darkness-brightness direction edges 124 and the brightness-darkness direction edges 126 are edges associated with the white line 122. The darkness-brightness direction edges 132 and the brightness-darkness direction edges 134 are edges associated with the white line 130. The brightness-darkness direction edges 138 are edges associated with the other shade 136.

In the predetermined area setting example 280, the road surface projection image 120 are divided into the integral multiple areas which are then made predetermined areas. In the predetermined area setting example 280, the road surface projection image 120 are divided into 8×8 areas. Here, predetermined areas 282, 284, 286, in particular, are described. The predetermined area 282 is a predetermined area including darkness-brightness direction edges 86 of the self-shade 84 of the mobile body 82. The predetermined area 282 is illustrated as an example in which edges included in the predetermined area 282 are not judged as a pair-edge. In the predetermined area 282, when average edge intensity Eave considering the brightness change direction does not meet the condition of the expression 16, it is judged that removal candidate edges of the predetermined area 282 are all not a pair-edge and made a removal target edge.

The predetermined area 284 is set to include the white line 122. The predetermined area 284 is illustrated as an example in which an edge included in the predetermined area 284 is judged as a pair-edge. When a sum of edge intensities considering the brightness change direction meets the condition of the expression 16, for example, it is judged that the removal candidate edges in the predetermined area 284 are all a pair-edge. More specifically, it is judged that the edge intensities are offset because a darkness-brightness direction edge and a brightness-darkness direction edge are present as a pair in the predetermined area 284.

The predetermined area 286 is set to include the white line 130. The predetermined area 286 is illustrated as an example in which an edge included in the predetermined area 286 is judged as a pair-edge. When average edge intensity Eave considering the brightness change direction meets the condition of the expression 16, for example, it is judged that removal candidate edges in the predetermined area 286 are all a pair-edge. Judgment as described above is made on all predetermined areas.

FIG. 22 is a view illustrating one example of a pair-edge exclusion method according to a variation example of the third embodiment. The pair-edge exclusion process in this embodiment is described as being performed by the pair-edge exclusion unit 53. In addition, this process is performed as the process of S204 of FIG. 16. The pair-edge exclusion unit 53 divides a road surface projection image into rn areas (rn is an integer of more than or equal to 1) and sets a predetermined area (S291). When a variable 1 is not l<rn (S292: NO), the pair-edge exclusion unit 53 returns the processing to the processing of FIG. 16. When the variable l is l<rn (S292: YES), the pair-edge exclusion unit 53 sets one predetermined area (S293).

The pair-edge exclusion unit 53 judges whether or not average Eave of edge intensities is less than or equal to a threshold (for example, whether the expression 16 is met) (S295). When the average edge intensity Eave is not less than or equal to the threshold (S295: NO), the pair-edge exclusion unit 53 shifts the processing to S297.

When the average edge intensity Eave is less than or equal to the threshold (S295: YES), the pair-edge exclusion unit 53 sets the removal edge flag sha="0" for all removal candidate edges in the corresponding predetermined area, in the edge list 190 (S296). In S297, the pair-edge exclusion unit 53 sets l=l+1, and returns the processing to S292. With the processing described above, the pair-edge exclusion process is carried out.

As described above in detail, with the movement amount estimation device according to the third embodiment that is configured to perform the pair-edge exclusion process, predetermined areas are the integral number of areas into which the road surface projection image 166 is divided. Thus, in addition to the effect of the first and second embodiment, and the variation example of the second embodiment, there is the effect of quickly carrying out the pair-edge exclusion process.

Fourth Embodiment

A movement amount estimation device 300 according to a fourth embodiment is described hereinafter. Same signs are assigned to a configuration and operation similar to the first to third embodiments, and the variation example of the second embodiment, and an overlapping description is omitted.

Figure 23:
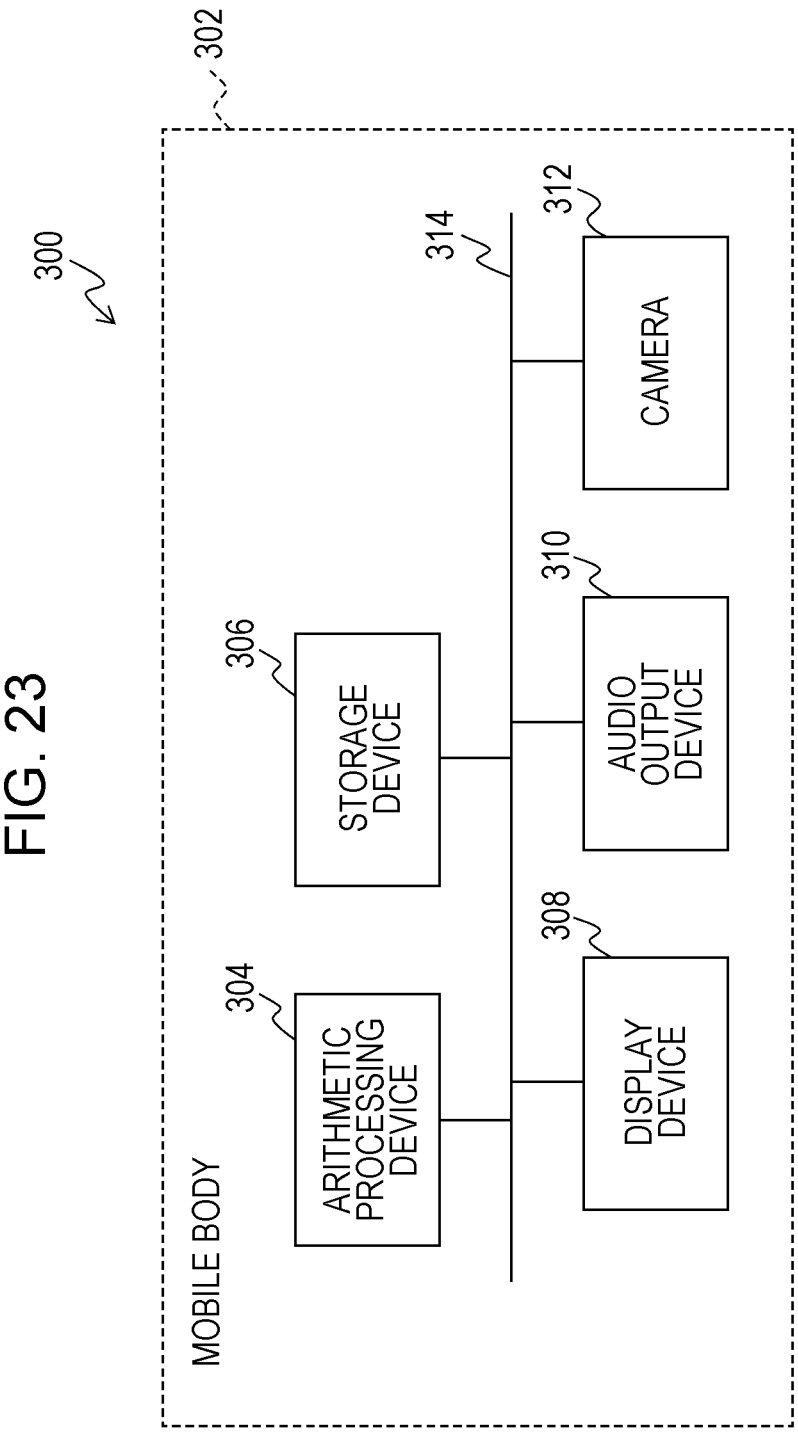
FIG. 23 is a view illustrating one example of a hardware configuration of a movement amount estimation device according to a fourth embodiment.

FIG. 23 is a view illustrating one example of a hardware configuration of the movement amount estimation device 300 according to the fourth embodiment. As illustrated in FIG. 23, the movement amount estimation device 300 is mounted on a mobile body 302, for example. The mobile body 302 is a vehicle, for example. The movement amount estimation device 300 includes an arithmetic processing device 304, a storage device 306, a display device 308, an audio output device 310, and a camera 312 which are coupled with a bus 314.

The arithmetic processing device 304 is a device configured to perform arithmetic operations for controlling operation of the movement amount estimation device 300. The arithmetic processing device 304 may also perform a process to control the movement amount estimation device 300 by reading and executing a program stored in advance in the storage device 306. The storage device 306 is a storage device capable of reading and writing at any time and configured to store a control program for the movement amount estimation device 300, a time-series projection image DB 328, or the like. The storage device 306 may be a drive device of a storage medium or a portable storage medium. The storage device 306 may also temporarily store information in the processing performed in the movement amount estimation device 300.

The display device 308 is a display device such as a liquid crystal display device, for example. The display device 308 may perform display related to an estimated movement amount, such as display of a current position together with a map, for example. The audio output device 310 is an audio output device such as a speaker. The audio output device 310 may output sound related to an estimated movement amount, such as output of sound related to a current position, for example. The camera 312 is an imaging device fixed to a predetermined location of the mobile body 302. The camera 312 includes one or more imaging devices.

Figure 24:
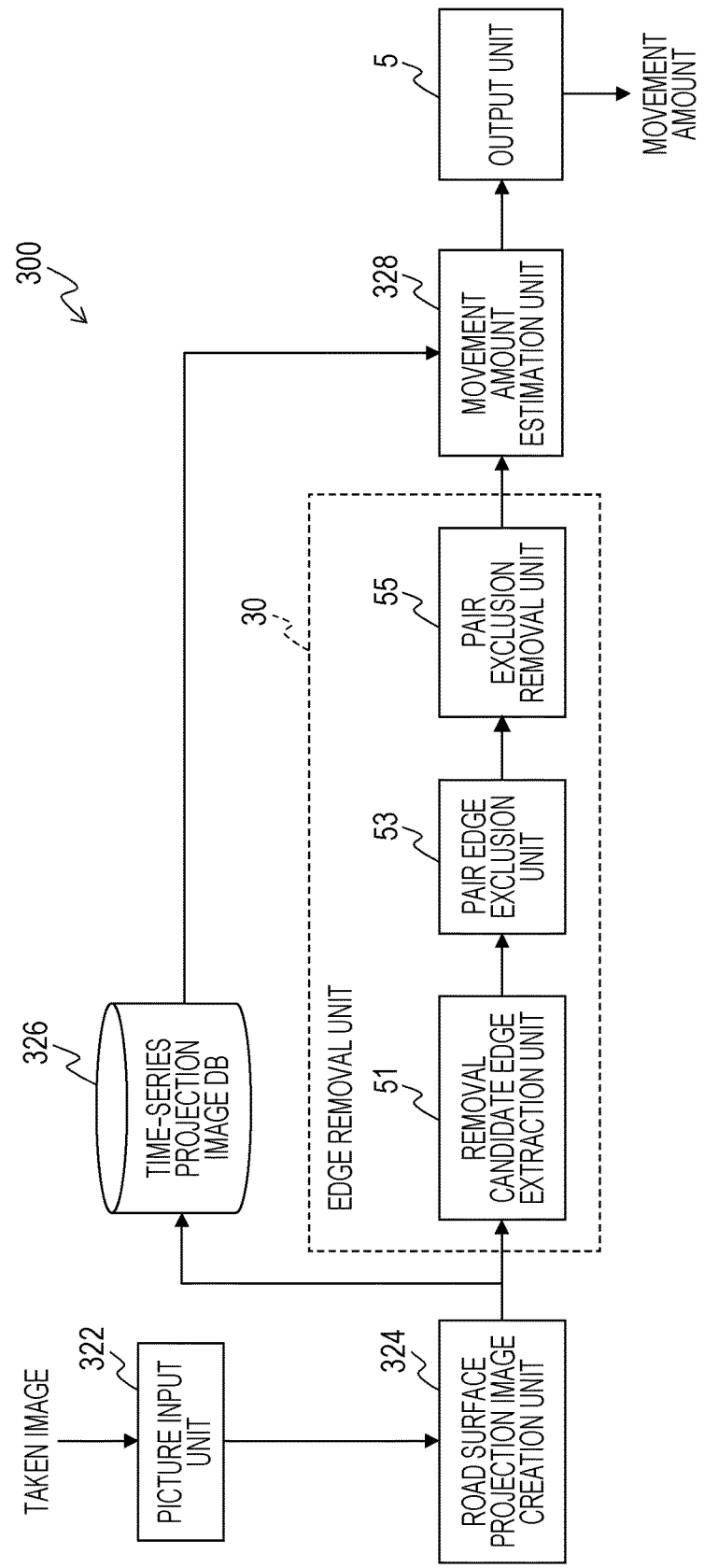
FIG. 24 is a block diagram illustrating one example of a functional configuration of the movement amount estimation device according to the fourth embodiment.

FIG. 24 is a block diagram illustrating one example of a functional configuration of the movement amount estimation device 300 according to the fourth embodiment. The movement amount estimation device 300 includes the edge removal unit 30 and the output unit 5 similar to the movement amount estimation device 50 according to the second embodiment. In addition, the movement amount estimation device 300 includes a picture input unit 322, a road surface projection image creation unit 324, a time-series projection image Data Base (DB) 326, and a movement amount estimation unit 328. These functions are implemented by, for example, causing the arithmetic processing device 304 to read and execute a control program stored in the storage device 306. Some of the functions of the movement amount estimation device 300 may also be implemented by an integrated circuit using a semiconductor, for example.

As illustrated in FIG. 24, after having a picture taken by the camera 312 inputted and performing predetermined processing, the picture input unit 322 outputs the picture to the road surface projection image creation unit 324. For example, when the inputted picture is an analog picture, the picture input unit 322 converts the analog picture into a digital picture. When the inputted picture is a color picture, the picture input unit 322 converts the color picture into a monochrome picture and stores the picture in a predetermined memory of the storage device 306. When a plurality of cameras are placed, the picture input unit 322 performs the predetermined processing on each picture and stores picture data of each in the predetermined memory.

From the picture data stored by the picture input unit 322, the road surface projection image creation unit 324 creates a road surface projection image (gray image) corresponding to a case in which a road surface is viewed from above. The road surface projection image creation unit 324 extracts an edge on this road surface projection image to create an edge image. The road surface projection image creation unit 324 stores the edge image in the time-series projection image DB 326 for processing of an image to be taken at a next cock time and outputs the edge image to the removal candidate edge extraction unit 51.

Here, details of the processing of the road surface projection image creation unit 324 are further described using a coordinate system. In a camera coordinate system of FIG. 13, Assume that coordinates of the point 180 on the object are (QX, QY, QZ), angle made by the QZ axis and the straight line 178 is angle θ, and angle made by the QX axis and a straight line 182 connecting the center 172 with the intersection point 176 is angle φ. Assume that coordinates of the center 172 in the camera image coordinate system px-py are (vx, vy), coordinates of the point 176 on the camera image 170 are (px, py), and a pixel value of pixels corresponding to the point 176 is pm (px, py). In addition, assume that actual size on the road surface 162 corresponding to size of one pixel of the road surface projection image 166 illustrated in FIG. 12 in the x axis direction is MX, and actual size on the road surface 162 corresponding to size of one pixel of the road surface projection image 166 in the y direction is MY.

Then, a pixel value v of pixels corresponding to a point of the coordinates (x,y) on the road surface projection image 166 is given by the following expressions 17 to 25.

$$v = pm(px, py) \quad \text{(Expression 17a)}$$

$$px = f \times \tan(\theta) \times \cos(\varphi) + vx \quad \text{(Expression 18)}$$

$$py = f \times \tan(\theta) \times \sin(\varphi) + vy \quad \text{(Expression 19)}$$

$$\theta = \arctan(sqrt(QX^2 + QY^2)/QZ) \quad \text{(Expression 20)}$$

$$\varphi = \arctan(QX/QY) \quad \text{(Expression 21)}$$

$$QV = \begin{pmatrix} QX \\ QY \\ QZ \end{pmatrix} = Rm * (U - Tm) \quad \text{(Expression 22)}$$

The matrix Rm is a rotating matrix of the camera 164 and the vector Tm is a translation vector of the camera 164. Coordinates U (UX, UY) represent coordinates in the road surface coordinate system O-XY at a position corresponding to the coordinates (x,y) on the road surface projection image 166, and are given by the following expression:

$$U = \begin{pmatrix} UX \\ UY \\ 0 \end{pmatrix} \quad \text{(Expression 23)}$$

$$UX = MX \times (x - cx) \quad \text{(Expression 24)}$$

$$UY = MY \times (y - cy) \quad \text{(Expression 25)}$$

By determining from a camera image at each clock time the pixel value v using the above-mentioned expression 17a to the expression 25, a road surface projection image of each clock time is generated. As such, a first image P1 at a first clock time T1 and a second image P2 at a second clock time T2 are generated as a road surface projection image. Note that the camera 312 may perform imaging at every predetermined time.

In addition, the road surface projection image creation unit 324 further generates an edge image from the road surface projection image. As described above, an edge image is created by causing a general differential operator such as Sobel to act on a road surface projection image, for example.

Processing of the edge removal unit 30 may be made identical to the processing described in the second embodiment. The processing in the variation example of the second embodiment and the third embodiment may also be used.

The time-series projection image DB 326 is a database configured to chronologically store images generated by the road surface projection image creation unit 324. For example, the time-series projection image DB 326 holds edge images of the current clock time and of one clock time ago. When the edge image of the current clock time is entered, an edge image of clock time prior to the last clock time is discarded to hold the edge image of the current clock time and the edge time of the one clock time ago. Note that although the time-series projection image DB 326 may store and use an edge image extracted from road surface projection images, pair-exclusion-edge-removed images may be stored in the time-series projection image DB 326 to reduce the storage capacity.

The movement amount estimation unit 328 matches images of a first pair-exclusion-edge-removed image based on the image that is taken at one cock time ago (first clock time) and stored in the time-series projection image DB 326 and a second pair-exclusion-edge-removed image based on the image that is obtained by the edge removal unit 30 and taken at a second clock time. More specifically, the movement amount estimation unit 328 matches perturbation of the first pair-exclusion-edge-removed image and the second pair-exclusion-edge-removed image, calculates an amount of perturbation at which edge patterns of both images match most, and calculates a movement amount of the mobile body based on the amount of perturbation. The output unit 5 outputs the calculated movement amount.

As an image matching method, a method for calculating a degree of matching by performing general image matching, such as Sum of Absolute Difference (SAD) may be used. A matching score S when edge intensity of each edge of the first pair-exclusion-edge-removed image is $E_{1m}(j,i)$, the edge intensity of each edge of the second pair-exclusion-edge-removed image is $E_{2m}(j+dx, i+dy)$, and the amount of perturbation is dx,dy is as depicted in the following expression 26.

$$S=\Sigma_i \Sigma_j (|E_{1m}(j,i)-E_{2m}(j+dx,i+dy)|)  \quad \text{(Expression 26)}$$

While perturbing both edge images in a horizon direction from −DX to DX and in a vertical direction from −DY to DY using the above expression 26, the movement amount estimation unit 328 compares both edge images at each perturbation position and calculates the matching score S. The movement amount estimation unit 328 makes a perturbation position where the calculated matching score S is smallest the best match position. This defines the best perturbation amount (dxm, dym) that gives the best match position. Furthermore, when size on the road surface occupied by one pixel in the road surface projection image is WX in the horizontal direction and WY in the vertical direction, a movement amount (MX, MY) is expressed as follows.

$$MX=dxm \times WX \quad \text{(Expression 27)}$$

$$MY=dym \times WY \quad \text{(Expression 28)}$$

As described above, with the movement amount estimation device 300 according to the fourth embodiment, a road surface projection image is generated based on an image of the surroundings taken by at least one camera 312 mounted on a mobile body. An edge image is generated based on the generated road surface projection image. The edge removal unit 30 removes a self-shade of the mobile body based on the brightness change direction viewed in the radial direction from the center of the mobile body to the outer side. Then, the edge removal unit 30 not removing from the edge image a pair-edge judged to be associated with a white line, a pair-exclusion-edge-removed image is generated. In the movement amount estimation device 300, a movement amount of the mobile body is estimated and outputted based on a first pair-exclusion-edge-removed image and a second pair-exclusion-edge-removed image based on images taken at two different clock times.

As described above, with the movement amount estimation device 300, when a movement amount is estimated, effect of the self-shade is removed while leaving an edge associated with a white line on a road surface. Therefore, even when the self-shade by illuminating light (sunlight) is imaged, a movement amount is estimated with high accuracy and in a stable manner.

Figure 25:
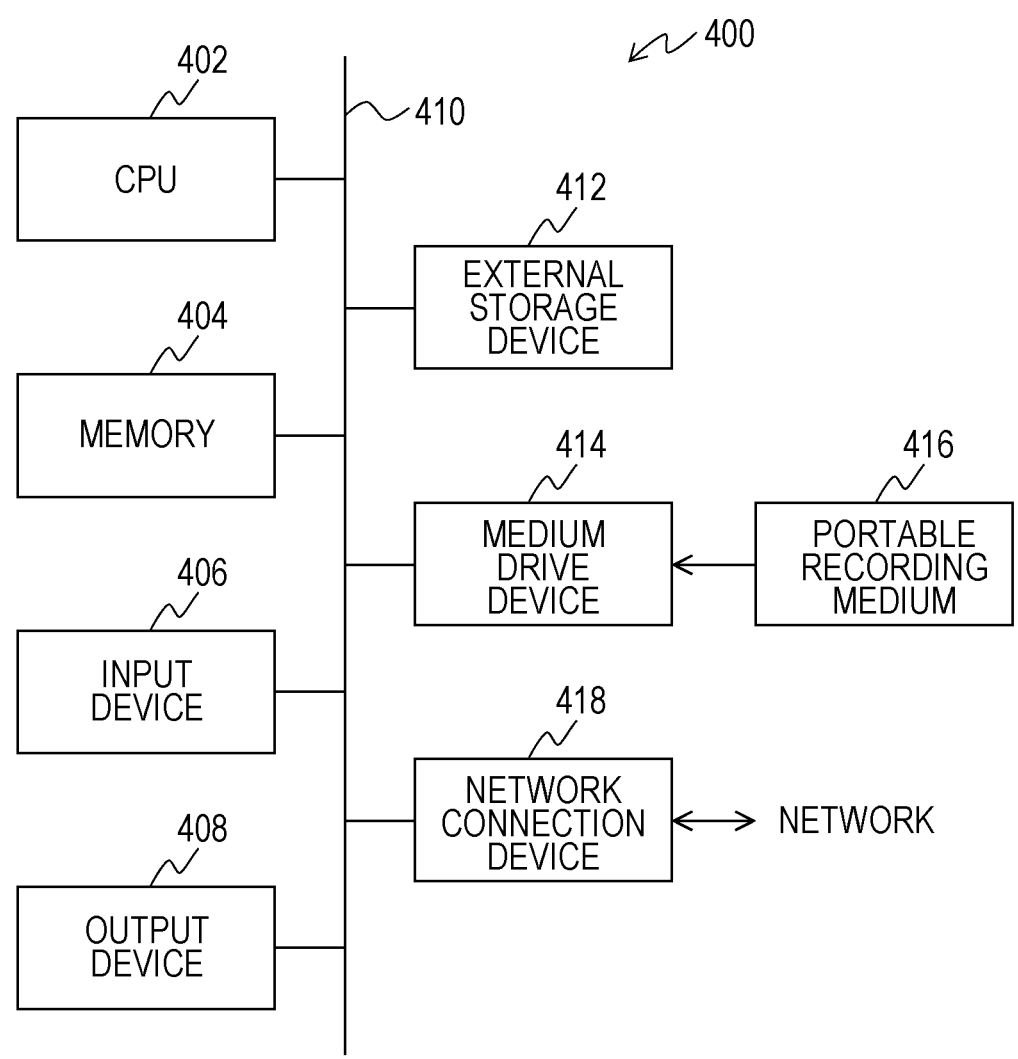
FIG. 25 is a view illustrating one example of a hardware configuration of a standard computer.

Here, an example of a computer that is commonly applied to cause the computer to perform the operation of the movement amount estimation method according to the first to fourth embodiments and the variation example of the second embodiment is described. FIG. 25 is a view illustrating one example of a hardware configuration of a standard computer. As illustrated in FIG. 25, in a computer 400, a central processing unit (CPU) 402, a memory 404, an input device 406, an output device 408, an external storage device 412, a medium drive device 414, a network connection device 418 and the like are connected via a bus 410.

The CPU 402 is an arithmetic processing device configured to control operation of the computer 400 as a whole. The memory 404 is a storage unit configured to store in advance a program to control the operation of the computer 400 and be used as a working area when executing a program. The memory 404 is, for example, a random access memory (RAM), a read only memory (ROM), and the like. The input device 406 is a device configured to acquire input of various information from users associated with content of the manipulation and send the acquired input information to the CPU 402, when manipulated by a computer user. The input device 406 is a keyboard device, a mouse device, for example. The output device 408 is a device configured to output a processing result by the computer 400 and includes a display device and the like. For example, the display device displays a text or an image according to display data to be sent from the CPU 402.

The external storage device 412 is a storage device such as a hard disk, for example, and is a device configured to store various control programs executed by the CPU 402 or acquired data and the like. The medium drive device 414 is a device configured to perform reading and writing on a portable recording medium 416. The CPU 402 may also perform various types of control processes by reading and executing a predetermined control program recorded in the portable recording medium 416 via the medium drive device 414. The portable recording medium is a compact disk (CD)-ROM, a digital versatile disc (DVD), a Universal Serial Bus (USB) memory, for example. The network connection device 418 is an interface device configured to manage delivery and receipt of various data performed with the outside world by cable or wirelessly. The bus 410 is a communication path configured to connect respective devices mentioned above with each other and exchange data.

A program configured to cause the computer to perform the movement amount estimation method according to the first to fourth embodiments and the variation example of the second embodiment described above is stored in the external storage device 412, for example. The CPU 402 performs an action to estimate a movement amount by reading a program from the external storage device 412 and executing the program stored in the memory 404. Then, first, a control program to cause the CPU 402 to perform the movement amount estimation process is created and stored in the external storage device 412. Then, a predetermined instruction is given to the CPU 402 from the input device 406, causing the CPU 402 to read this control program from the external storage device 412 and execute the control program. In addition, this program may be stored in the portable recording medium 416.

In addition, the present disclosure is not limited to the embodiments described above and may adopt various configurations or embodiments without departing from the scope of the disclosure. For example, each expression mentioned above is an example, and may be changed in a range that does not go beyond what each expression means. In addition, for a condition to be used in judgment, the above description is an example and may be changed as far as the condition does not depart from the scope. In addition, such a change that the edge removal unit 3 is applied in place of the edge removal unit 30 according to the fourth embodiment or that the variation example according to the second embodiment is applied may be acceptable.

As another variation example, a system that inputs to the computer 400 via network a picture from at least one camera mounted on a mobile body, and transmit an outputted movement amount to the mobile body via a communication network may also be conceived.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A movement amount estimation device, comprising:
   at least one processor; and
   at least one memory which stores a plurality of instructions, which when executed by the at least one processor, cause the at least one processor to execute:
   generating a first edge removed image by removing a first removal target edge based on a change in brightness indicated by edge intensity in one direction from an inner side to an outer side of a mobile body from a first edge image, the first edge image being generated from a first image taken by an imaging device mounted on the mobile body;
   generating a second edge-removed image by removing a second removal target edge based on the change in brightness indicated by the edge intensity in the direction from the inner side to the outer side of the mobile body from a second edge image, the second edge image being generated from a second image taken at a different clock time than the first image; and
   outputting a movement amount of the mobile body that is estimated based on the first edge-removed image and the second edge-removed image.

2. The movement amount estimation device according to claim 1, wherein the first removal target edge and the second removal target edge are edges whose brightness change direction viewed in the direction from the inner side to the outer side of the mobile body indicates a change direction from darkness to brightness.

3. The movement amount estimation device according to claim 1, wherein the at least one processor further executes:
   extracting a first removal candidate edge that is judged to be removed based on the brightness change direction viewed in the direction from the inner side to the outer side of the mobile body in the first edge image, and to extract a second removal candidate edge that is judged to be removed based on the brightness change direction viewed in the direction from the inner side to the outer side of the mobile body in the second edge image;
   determining whether or not the first removal candidate edge is a first pair edge in the first edge image, the first pair-edge being associated with an edge in a neighborhood of the first removal candidate edge, a change in brightness of a pair of the edge and the first removal candidate edge being offset based on the each brightness change direction and each amount of the change in brightness of the edge and the first removal candidate edge,
   excluding the first pair-edge from a first set of the first removal candidate edges, and
   determining whether or not the second removal candidate edge is a second pair-edge in the second edge image, the second pair-edge being associated with an edge in a neighborhood of the second removal candidate edge, a change in brightness of a pair of the edge and the second removal candidate edge being offset based on the each brightness change direction and the each amount of the change in brightness of the edge and the second removal candidate edge,
   excluding the second pair-edge from a second set of the second removal candidate edges;
   generating a first pair-exclusion-edge-removed image by removing from the first edge image the first set of the first removal candidate edges in which the first pair-edge is excluded, and
   generating a second pair-exclusion-edge-removed image by removing from the second edge image the second set of the second removal candidate edges in which the second pair-edge is excluded,
   wherein the outputting outputs the movement amount of the mobile body that is estimated based on the first pair-exclusion-edge-removed image and the second pair-exclusion-edge-removed image.

4. The movement amount estimation device according to claim 3, wherein the at least one processor further executes making the first removal candidate edge the first pair-edge when average edge intensity considering the change direction is less than or equal to a predetermined value in a first predetermined area corresponding to the first removal candidate edge in the first edge image, and to make the second removal candidate edge the second pair-edge when the average edge intensity considering the change direction is less than or equal to the predetermined value in a second predetermined area including the second removal target edge in the second edge image.

5. The movement amount estimation device according to claim 4, wherein the first predetermined area is a rectangular area that includes one of the first set of the first removal candidate edges and has sides parallel to edge gradient of the one of the first set of the first removal candidate edges, and the second predetermined area is a rectangular area that includes one of the second set of the second removal candidate edges and has sides parallel to edge gradient of the one of the second set of the second removal candidate edges.

6. The movement amount estimation device according to claim 4, wherein the first predetermined areas are a plurality of areas into which the first edge image is divided and the second predetermined areas are a plurality of areas into which the second edge image is divided.

7. The movement amount estimation device according to any of claim 1 to claim 6, wherein it is judged that the change direction at one point on the first edge image or the second edge image indicates a change from darkness to brightness when angle made by a vector representative of edge gradient based on edge intensities in two mutually orthogonal directions at the one point and by the direction from the inner side to the outer side of the mobile body fails within a predetermined angle range.

8. A movement amount estimation method to be performed by a Computer, the method comprising:
generating a first edge-removed image by removing first removal target edges based on a change in brightness indicated by edge intensity in one direction from the inner side to the outer side of a mobile body in a first edge image, the first edge image being generated from a first image taken by an imaging device mounted on the mobile body;
generating a second edge-removed image by removing second remove target edges based on the change in brightness indicated by the edge intensity in the direction from the inner side to the outer side in a second edge image, the second edge image being generated from a second image taken at a different clock time from the first image; and
outputting a movement amount of the mobile body that is estimated based on the first edge-removed image and the second edge-removed image.

9. The movement amount estimation method according to claim 8, the first removal target edges and the second removal target edges are edges whose brightness change direction viewed in the direction from the inner side to the outer side of the mobile body indicates a change direction from darkness to brightness.

10. The movement amount estimation method according to claim 8, further comprising:
extracting a first removal candidate edge that is judged to be removed based on the brightness change direction viewed in the direction from the inner side to the outer side of the mobile body in the first edge image, and to extract a second removal candidate edge that is judged to be removed based on the brightness change direction viewed in the direction from the inner side to the outer side or the mobile body in the second edge image;
determining whether or not the first removal candidate edge is a first pair-edge in the first edge image, the first pair-edge being associated with an edge in a neighborhood of the first removal candidate edge, a change in brightness of a pair of the edge and the first removal candidate edge being offset based on the each brightness change direction and each amount of the change in brightness of the edge and the first removal candidate edge,
excluding the first pair-edge from a first set of the first removal candidate edges, determining whether or not the second removal candidate edge is a second pair-edge in the second edge image, the second pair-edge being associated with an edge in a neighborhood of the second removal candidate edge, a change in brightness of a pair of the edge and the second removal candidate edge being offset based on the each brightness change direction and the each amount of the change in brightness of the edge and the second removal candidate edge, and
excluding the second pair-edge from a second set of the second removal candidate edges;
generating a first pair-exclusion-edge-removed image by removing from the first edge image the first set of the first removal candidate edges in which the first pair-edge is excluded, and
generating a second pair-exclusion-edge-removed image by removing from the second edge image the second set of the second removal candidate edges in which the second pair-edge is excluded,
wherein the outputting outputs the movement amount of the mobile body that is estimated based on the first pair-exclusion-edge-removed image and the second pair-exclusion-edge-removed image.

11. The movement amount estimation method according to claim 10, further comprising:
making the first removal candidate edge the first pair-edge when average edge intensity considering the change direction is less than or equal to a predetermined value in a first predetermined area corresponding to the first removal candidate edge in the first edge image, and making the second removal candidate edge the second pair-edge when the average edge intensity considering the change direction is less than or equal to the predetermined value in a second predetermined area including the second removal target edge in the second edge image.

12. The movement amount estimation method according to claim 11, wherein the first predetermined area is a rectangular area that includes one of the first removal candidate edges and has sides parallel to edge gradient of one of the first removal candidate edges, and the second predetermined area is a rectangular area that includes one of the second removal candidate edges and has sides parallel to edge gradient of one of the second removal candidate edges.

13. The movement amount estimation method according to claim 11, wherein the first predetermined areas are a plurality of areas into which the first edge image is divided and the second predetermined areas are a plurality of areas into which the second edge image is divided.

14. The movement amount estimation method claim 8, wherein it is judged that the change direction at one point on the first edge image or the second edge image indicates a change from darkness to brightness when angle made by a vector representative of edge gradient based on edge intensities in two mutually orthogonal directions at the one point and by the direction from the inner side to the outer side of the mobile body falls within a predetermined angle range.

15. A non-transitory computer-readable recording medium storing a movement amount estimation program for causing an information processing apparatus to execute a procedure, the procedure comprising:
generating a first edge-removed image by removing first removal target edges based on a change in brightness indicated by edge intensity in one direction from the inner side to the outer side of a mobile body in a first edge image that is generated from a first image taken by an imaging device mounted on the mobile body;

generating a second edge-removed image by removing second removal target edges based on the change in brightness indicated by the edge intensity in the direction from the inner side to the outer side of the mobile body in a second edge image that is generated from a second image taken at a different clock time from the first image; and outputting a movement amount of the mobile body that is estimated based on the first edge-removed image and the second edge-removed image.

* * * * *